(12) United States Patent
Sharon

(10) Patent No.: US 10,689,872 B2
(45) Date of Patent: Jun. 23, 2020

(54) METHOD FOR PRODUCING A COVER FOR A CONTAINER AND A COVER

(71) Applicant: Ofer Sharon, Kiryat Haim (IL)

(72) Inventor: Ofer Sharon, Kiryat Haim (IL)

( * ) Notice: Subject to any disclaimer, the term of this patent is extended or adjusted under 35 U.S.C. 154(b) by 642 days.

(21) Appl. No.: 15/079,026

(22) Filed: Mar. 23, 2016

(65) Prior Publication Data
US 2016/0281379 A1    Sep. 29, 2016

(30) Foreign Application Priority Data
Mar. 25, 2015   (IL) .......................................... 237942

(51) Int. Cl.
| | |
|---|---|
| *E04H 4/08* | (2006.01) |
| *B29C 45/14* | (2006.01) |
| *B65D 43/02* | (2006.01) |
| B65D 81/38 | (2006.01) |
| B29K 27/06 | (2006.01) |
| B29K 675/00 | (2006.01) |

(52) U.S. Cl.
CPC ......... *E04H 4/08* (2013.01); *B29C 45/14467* (2013.01); *B65D 43/0202* (2013.01); *B29C 45/14795* (2013.01); *B29K 2027/06* (2013.01); *B29K 2675/00* (2013.01); *B29K 2715/003* (2013.01); *B65D 81/38* (2013.01)

(58) Field of Classification Search
CPC ........ B29C 45/14467; B29C 14/14795; B29C 44/1228; B29C 44/1252; B29C 44/1257
USPC ...................................................... 264/241
See application file for complete search history.

(56) References Cited

U.S. PATENT DOCUMENTS

| | | | |
|---|---|---|---|
| 4,422,192 A | * | 12/1983 | Jacobs ...................... E04H 4/08 4/496 |
| 5,086,525 A | | 2/1992 | Christopher |
| 5,685,032 A | | 11/1997 | Watkins et al. |
| 5,853,512 A | | 12/1998 | McKinney |
| 5,996,137 A | | 12/1999 | Genova |
| 6,112,340 A | | 9/2000 | Ziebert et al. |
| 6,842,917 B1 | | 1/2005 | Genova |
| 7,174,576 B1 | | 2/2007 | Tedrick |

(Continued)

FOREIGN PATENT DOCUMENTS

CA    2454775 A1    7/2005

OTHER PUBLICATIONS

Israeli Search Report issued in counterpart Israeli Application No. 237942.

*Primary Examiner* — Jacob T Minskey
*Assistant Examiner* — Cedrick S Williams
(74) *Attorney, Agent, or Firm* — Holtz, Holtz & Volek PC

(57) ABSTRACT

A cover and a method for automatically producing a cover having at least one cover panel for covering a container, the method using a mold having an open state and a closed state. The method operates in three steps. First, by opening the mold to the open state and assembling therein, free of mechanical fasteners, of at least two functionally different cover elements. Second, closing the mold to the closed state and injecting therein at least one substance that solidifies for forming a structural material which forms a third cover element. Third, opening the mold to the open state and retrieving the cover thereout ready for use. The cover is void of mechanical fasteners and has at least two functionally different cover elements which include at least a belt and a reinforcement structure.

11 Claims, 16 Drawing Sheets

(56) References Cited

U.S. PATENT DOCUMENTS

| | | |
|---|---|---|
| 8,205,407 B2 | 6/2012 | Genova |
| 8,726,429 B1 | 5/2014 | Midkiff |
| 8,813,275 B2 | 8/2014 | Genova |
| 2005/0086731 A1* | 4/2005 | Scott ........................ E04H 4/08 4/498 |
| 2005/0144714 A1 | 7/2005 | Peng et al. |
| 2006/0165947 A1* | 7/2006 | Kellogg ................ B29C 67/246 428/71 |
| 2007/0039093 A1* | 2/2007 | Tedrick .................... E04H 4/08 4/498 |
| 2007/0245479 A1* | 10/2007 | Schroeder ................ E04H 4/08 4/498 |
| 2008/0034491 A1* | 2/2008 | Scott ........................ E04H 4/08 4/498 |
| 2013/0031713 A1 | 2/2013 | Kite |

* cited by examiner

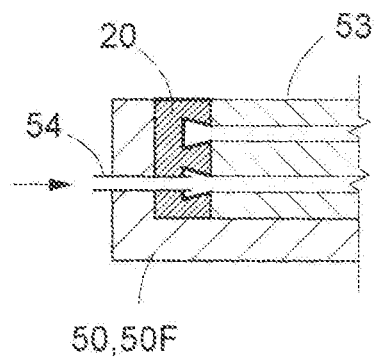
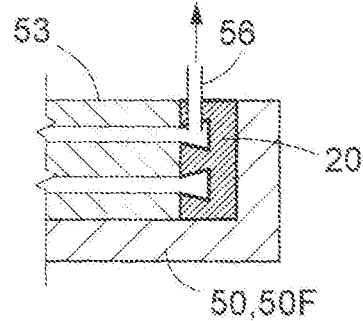
FIG.19  FIG.20
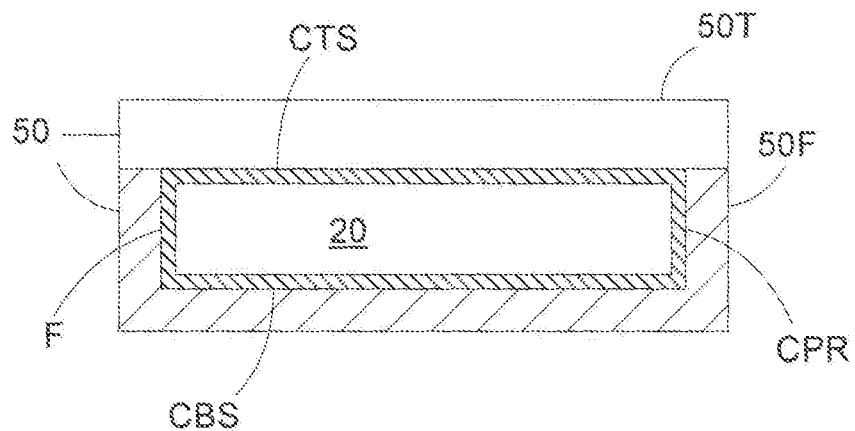
FIG.21

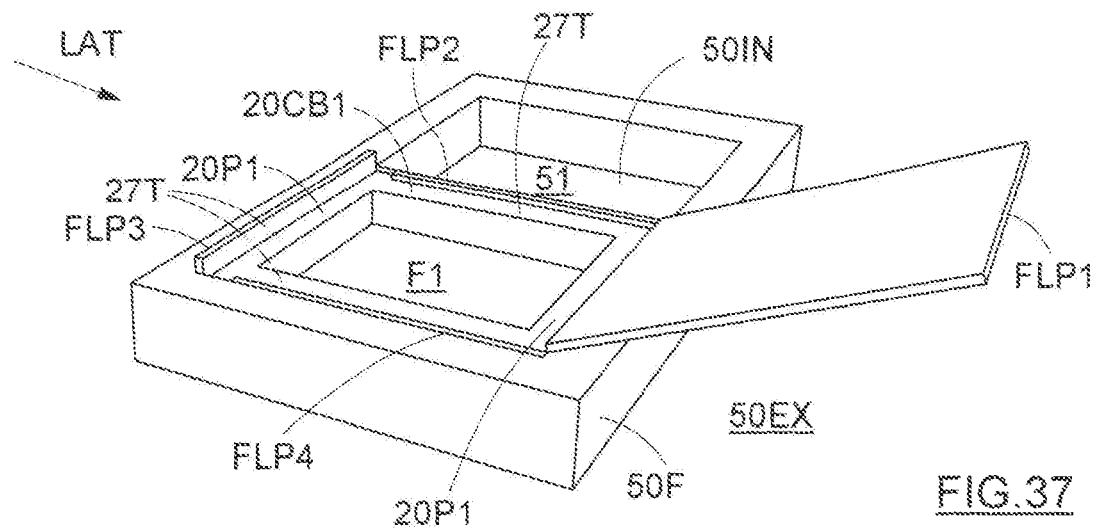
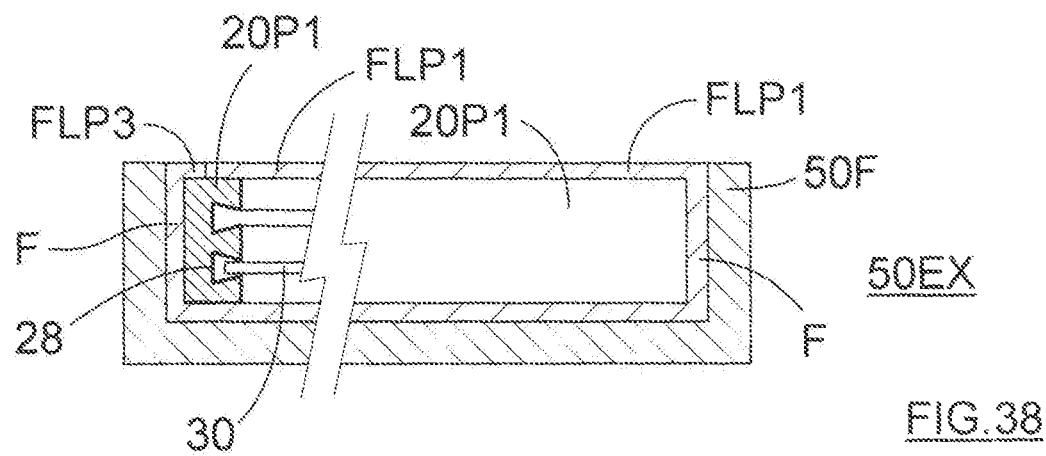
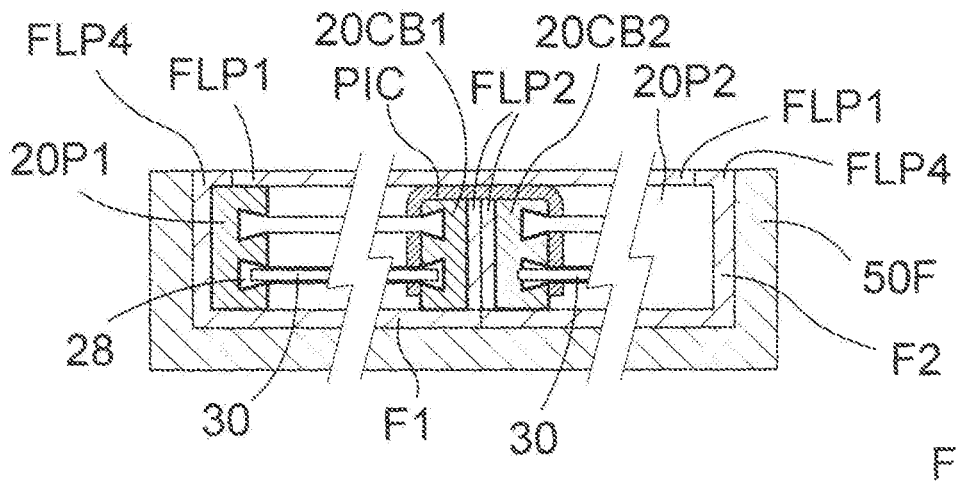

METHOD FOR PRODUCING A COVER FOR A CONTAINER AND A COVER

BACKGROUND

Technical Field

The embodiments described hereinbelow relate to a method for producing a cover for a container and to a cover produced by help of the method, and in particular, to a lightweight thermally insulating and load supporting cover manufactured by automatic production equipment in one molding step as a ready to use product.

Technical Problem

Covers for containers enclosing liquids, such as industrial containers or spa's, or 'hot tubs', are well known per se. The containers may hold liquid having a temperature different from the ambient temperature prevailing on the exterior of the container. However, those covers are usually quite expensive and wear out rapidly. The problem thus concerns the ability to produce low-cost but long lasting covers having one or more cover panels. A cover is required to be lightweight, thermally insulating, be able to support loads disposed thereon, be free of mechanical fasteners and of machining during assembly, and be wear resistant. Furthermore, the cover is preferably configured for assembly in one direction to enhance automatic or robotic production, and be manufactured as a ready to use product made by one molding step.

However, the disclosures referred to hereinbelow do not seem to solve the problem.

U.S. Pat. Nos. 5,996,137, 6,842,917, 8,205,407, and 8,813,275 to M. C. Genova, recite a cover for a spa including an aggregation of elements coupled together, requiring manual assembly and/or using mechanical fasteners.

US Patent Application No. 2013/0031713 to M. Kite, referred to as Kite hereinbelow, discloses a hot tub cover having two caps with a new hinge and a spring system to compensate for the weight of the cover. Kite discloses a cover lifter mechanical system for removing hot tub covers, using a motor, chain, pulley, cable, lever, rod, railing, or a similar mechanism.

U.S. Pat. No. 7,174,576 to J. Tedrick, divulges a spa cover that requires machining during assembly.

U.S. Pat. No. 6,112,340 to P. D. Ziebert et al., recites a cover with a mechanism that accommodates a difference in thermal coefficients and uses mechanical fasteners such as screws and rivets.

U.S. Pat. No. 5,853,512 to M. M. McKinney et al. disclose a method and apparatus for fabrication of unitary foam panels for doors, insulated walls, floors or ceilings.

U.S. Pat. No. 5,086,525 to L. D. Christopher recites a spa cover for use on a spa having a one-piece insulating insert.

U.S. Pat. No. 4,422,192 to T. Jacobs recites a spa or hot tub cover having two symmetrical halves that is assembled by use of staples and rivets.

U.S. Pat. No. 5,685,032 to Watkins Mfg. Corp., recites a portable spa including a cover having two rotationally molded interlocking halves.

CA Patent No. 2,454,775 to Amendt Darcy et al., divulges a spa cover having a foam core encased in a bag.

U.S. Pat. No. 8,726,429 to Daviv Midkiff discloses a roto-molded spa cover which has two cover pieces with bracket supports.

The background art does not seem to provide a solution to the problem, such as for example, automatic production.

Solution to the Problem

The solution is provided by a lightweight cover design with load supporting ability as well as unidirectional assembly for enhancing automatic manufacture or robotic assembly and production. The solution permits to produce a cover having a plurality of mutually hinged cover panels by building the cover out of mutually supporting modular cover elements in association with one molding cycle. The cover elements are introduced in unidirectional direction into a mold for aggregation of the cover elements with a foamed thermally insulating structural material, whereafter the cover is retrieved out of the mold as a finished product ready for use.

Advantageous Effects of the Invention

The solution provides lightweight, water impervious and thermally insulating container covers of low-cost, having a long-lasting operational life, which are made by automatic or robotic manufacture and void or free of mechanical fasteners such as bolts, screws and rivets for example. The modular elements of the cover are self supportive and operate in mutual synergy to perform more than one task. Furthermore, the cover may be produced in one automatic molding cycle.

It would therefore be advantageous to provide a method for producing a lightweight, load supporting, water impervious and insulating cover assembled and made in a mold in one automatic molding step as a ready to use product.

SUMMARY

There is provided a cover and a method for producing a cover having at least one cover panel for covering a container. The method uses a mold having an open state and a closed state for producing the cover in the following steps. First, opening the mold to the open state and assembling therein, free of mechanical fasteners, of at least two functionally different cover elements. Second, closing the mold to the closed state and injecting therein at least one substance that solidifies for forming a structural material which forms a third cover element. Third, opening the mold to the open state and retrieving the cover thereout ready for use.

Alternatively, there is provided an automatic method for producing a cover for a container by using a mold having an open state and a closed state, wherein the cover has at least one cover portion. The method may include the following steps. First, operating a robot for controllably and automatically inserting and assembling at least two functionally different cover elements in the mold which is disposed in the open state, and mutually assembling the cover elements in fastener-free assembly. Next, closing the mold and automatically injecting therein by controlled operation of at least one substance for forming a solidified third cover element Finally, opening the mold automatically and retrieving the cover thereout as a finished product ready for use.

There is also provided a cover having at least one cover panel configured to cover a container opening, wherein the cover is made by use of a mold having an open state and a closed state. The cover has at least two functionally different cover elements configured to be assembled in the mold when in the open state, wherein the assembly is free of mechanical fasteners. The cover further has a structural material which is a third cover element that is formed by solidification of at least one substance that is injected in the mold when in the closed state. Then, opening of the mold to the open state allows to retrieve the cover thereout ready for use.

BRIEF DESCRIPTION OF THE DRAWINGS

Non-limiting embodiments of the invention will be described with reference to the following description of exemplary embodiments, in conjunction with the figures. The figures are generally not shown to scale and any measurements are only meant to be exemplary and not necessarily limiting. In the figures, identical structures, elements, or parts that appear in more than one figure are preferably labeled with a same or similar number in all the figures in which they appear, in which:

FIGS. 19 and 20 show an injection nozzle and of a vacuum port passing through a portion of a belt, FIG. 21 illustrates an embodiment of the cover enveloped by a foil.

DESCRIPTION OF EMBODIMENTS

Figure 1:
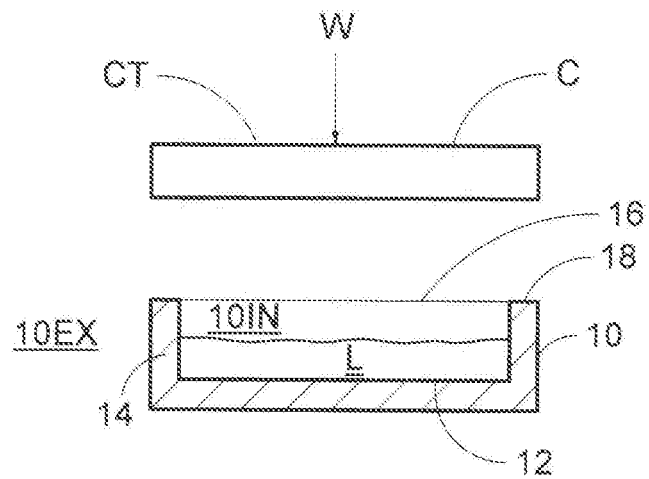
FIG. 1 shows a side view of a cover and a cross-section of a container.

FIG. 1 shows a side view of a cover C and a cross-section of a container 10 for holding a liquid L, where the container C may range from an industrial container to a household spa.
Single Panel Cover FIG. 1 illustrates a typical cross-section of the container 10 having a container bottom 12 from which extend container walls 14 that define the container opening 16 which has a container rim 18. The cover C, which has a cover top CT and a lateral peripheral boundary 19, which may be configured and operable as a handgrip HG, may be used for reversibly covering the container opening 16. The container 10 has a container interior 10IN and a container exterior 10EX and may contain a liquid L having a temperature that is different from the ambient temperature existing on the exterior 10EX of the container 10.

The cover C described in the present disclosure may be implemented out of materials being lightweight enough to be easily handled manually by one person to cover the container opening or be removed away therefrom. The same may be true for a cover C for a household size container 10, such as for a sauna for example, even if having two or three cover panels with modular cover elements E that may include a belt 20, here a peripheral belt.

Figure 2:
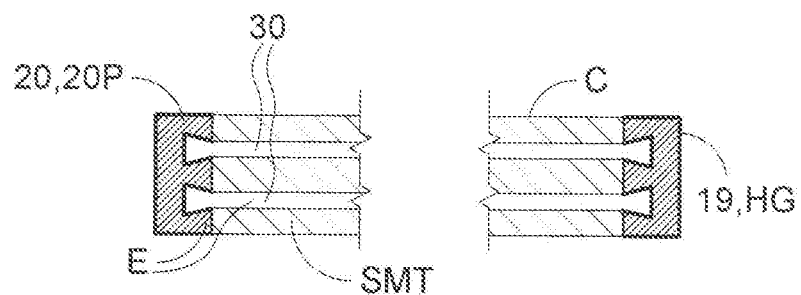
FIG. 2 depicts a schematic cross-section of an exemplary embodiment of the cover.

FIG. 2 depicts a schematic partial cross-section of an exemplary embodiment of the cover C showing modular cover elements E which may include a belt 20, here a peripheral belt 20P, a reinforcement structure 30, and one or more substances that solidify into a rigid structural material SMT. The one or more selected substances for forming a solidified structural material SMT are referred to hereinbelow as 'the substance', or 'the selected substance'. It is noted that the term 'belt 20' refers to a belt in general, thus to a peripheral belt 20P or to another belt 20, such as a central belt 20CB described hereinbelow. The peripheral belt 20P may form and cover the lateral peripheral boundary 19 of the cover C and supports the reinforcement structure 30 and the (solidified) structural material SMT. The peripheral belt 20P may be operative as a thermal barrier, a support for the reinforcement structure 30, a support for the structural material SMT, and a protective lateral peripheral boundary 19 of the cover C. Protective is meant in the sense of protecting from impacts impinging thereon, and/or insulating for preventing heat exchange, and/or abrasion resistant. In turn, the solidified structural material SMT fills the volume enclosed by the peripheral belt 20, embeds therein the reinforcement structure 30 which may help to enhance and maintain the integrity of the shape of the belt and the load-supporting rigidity of the cover C. Each one of the cover elements E thus performs multiple tasks whereby the cover elements E are mutually supportive and cooperative in synergetic functionality.

Figure 3:
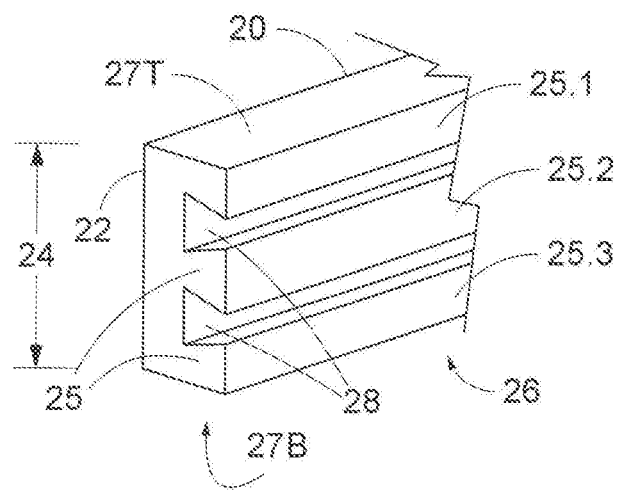
FIG. 3 shows an exemplary isometric view of a portion of an extruded belt.

FIG. 3 shows an exemplary isometric view of a portion of an extruded belt 20, such as the peripheral belt 20P. The cross-section of the belt 20 may have a lateral belt back 22, a belt height 24, and a belt serrated side 26 carrying at least one serration 28. The belt 20 may further have a belt top 27T and a belt bottom 27B. A belt 20 may have one or more serrations 28 forming belt teeth 25 which may be shaped as dovetails for example. The belt teeth 25 may be numbered starting from the belt top 27T and down to the belt bottom 27B. For example for a belt 20 with three teeth 25, one may indicate the teeth as 25.1, 25.2, and 25.3 respectively. The serration(s) 28 may enhance the mutual coupling of the belt 20 to the structural material SMT, and to the reinforcement structure 30 and may provide support for the reinforcement structure 30. Evidently, the cross-sectional profile of the belt 20 and the shape of the belt teeth 25 and of the serration(s) 28 may be selected as desired.

The belt 20 is preferably made out a pliable and/or flexible material which may be cut to desired length and may, as described hereinbelow, easily accept the shape of the mold portion into which the belt 20 is disposed. The belt 20 may be extruded for example, out of one or more material(s) which may be chosen to be of desired flexibility and rigidity. The belt material may be selected as an impact resistant flexible and thermal insulating material such as PVC (polyvinyl chloride) for example.

Figure 4:
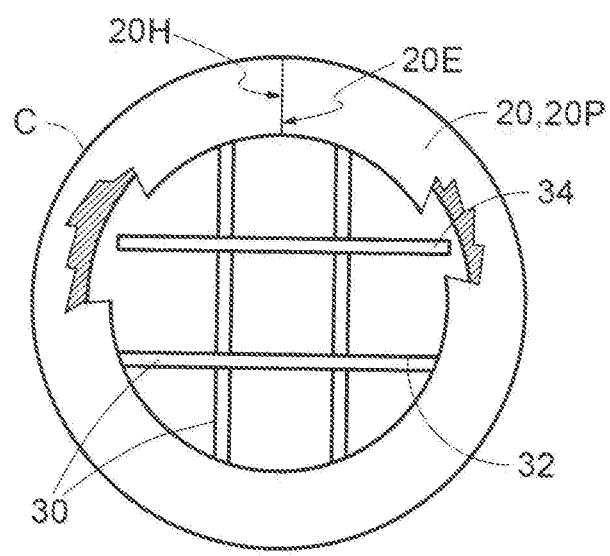
FIG. 4 illustrates a plan view of an exemplary embodiment of a reinforcement structure.
Figure 5:
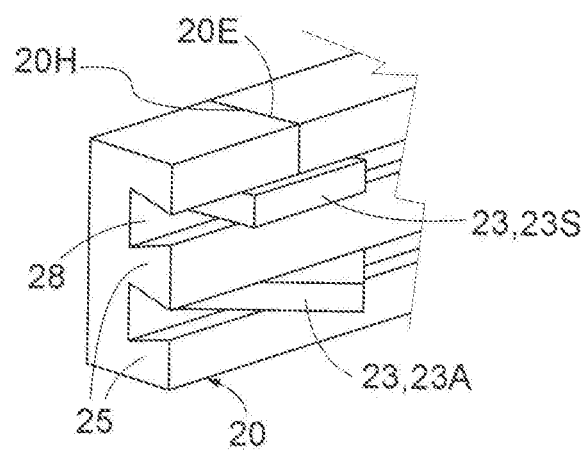
FIG. 5 shows a belt head joined to a belt end.

FIG. 4 illustrates a plan view of an exemplary embodiment of a cover C having for example a circular shape and a reinforcement structure 30. The reinforcement structure 30 may include one or more structural members 32 in the form of rods or beams such as the four structural members 32 shown in FIG. 4. The reinforcement structure 30 is supported by or supports the peripheral belt 20P, but for the sake of clarity, the structural material SMT is not shown in FIG. 4. The structural material SMT actually supports or is supported by the peripheral belt 20P and by the reinforcement structure 30, wherein the three cover elements E operate in synergy. The peripheral belt 20P is shown to have been cut to length for the belt head 20H to meet the belt end 20E at a belt junction 21 when the belt 20 is disposed in a female mold portion 50F of a mold 50 shown in FIGS. 16 and 17 for example. The solidified structural material SMT, like the reinforcement structure 30, may suffice to couple and join the belt head 20H to the belt end 20E in mutual retention. If desired, the belt head 20H may be bonded or glued to the belt end 20E. Joining together means permanent or temporary joining for example, by help of an adhesive or of a wedge 23. As shown in FIG. 5, a wedge 23, such as a straight wedge 23S, or a straight side of an angle wedge 23A having say a triangular shape, may mate the shape of a serration 28. The wedge 23 may be shaped to provide a selected force fit retention when inserted in a serration 28 for joining together two belts 20 or two portions of a same belt 20, and may be retained in place by the structural material SMT and/or by adhesive and be glued in the serration(s) 28 if desired.

As shown in FIG. 4, the reinforcement structure 30 may be configured as a structural entity having a grid of structural members 32 supporting the integrity of the shape of the peripheral belt 20P and the rigidity of the cover C. It may also be said that the support is mutual, i.e. that the peripheral belt 20P supports the reinforcement structure 30. Once the injected one or more substance(s) has/have solidified into the structural material SMT, the reinforcement structure 30 is fixedly attached to the belt 20 to rigidize the cover C and permits the support of loads W, disposed thereon, as shown by the arrow marked W in FIG. 24. However, the partial cutout cross-sections shown in FIG. 4 illustrate that an end extremity 34 of the structural members 32 may be introduced in controlled force fit retention into a serration 28. Such an assembly may take advantage of the relative flexibility of the teeth 25 of the belt 20, which allows momentary expansion of a serration 28 for the introduction therein of an appropriately shaped end extremity 34 of a structural member 32. Once the structural material SMT has solidified, the reinforcement structure 30 is fixedly attached to the belt 20 to form a rigid cover C. If desired, the end extremity 34 may be kept captive in a serration 28 by friction, and/or by the structural material SMT and/or be adhesively glued in the serration 28.

Figure 6:
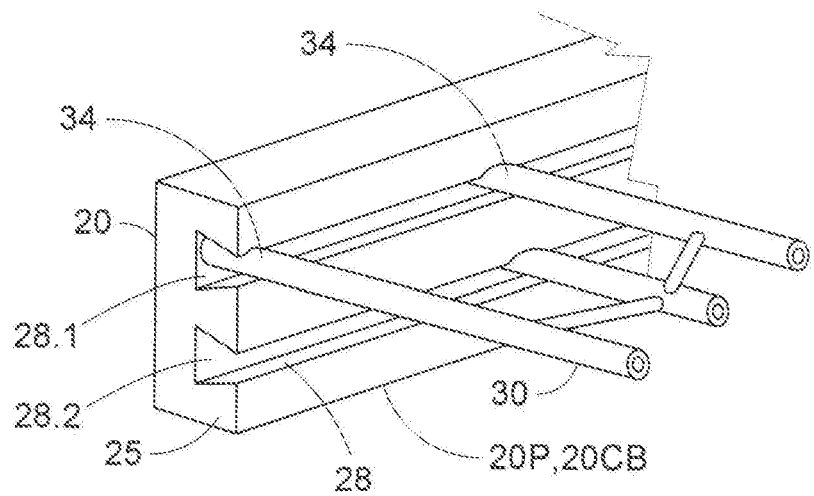
FIG. 6 depicts end extremities of a structural members disposed in a serration.

The structural members 32 which form the built reinforcement structure 30 may be selected as one or more tubes, rods, structural beams, such as an I-beam for example, or may have another chosen cross-sectional shape, or may be formed as a grid or as a built truss structure. In FIG. 6, the end extremities 34 of the structural members 32 of a truss structure for example, are shown to be disposed in a first or upper serration 28.1 and in a second or lower serration 28.2, of a belt 20. The structural members 32 may thus be coupled to the belt 20, here the peripheral belt 20P, and form a truss structure that engages more than one serration 28. A reinforcement structure 30 may thus have end extremities 34 that engage one or more than two serration 28 when available, and support the integrity of the shape of the peripheral belt 20P and the rigidity of the cover C. Furthermore, different reinforcement structures 30 may be supported by, or support, a peripheral belt 20P.

Figure 7:
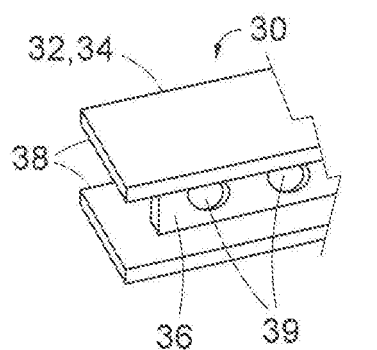
FIGS. 7, 8 and 8A illustrate a portion of an exemplary reinforcement structure.

FIG. 7 illustrates a portion of an exemplary reinforcement structure 30 showing the extremity 34 of a structural member 32 formed out of an I-beam or H-beam. The web 36 of the I-beam has been partially cut away to allow the protruding flange portions 38 to support, or be supported by the serrations 28.1 and 28.2 of the peripheral belt 20P. If desired, although not shown in the Figs., the extremity 34 of the I-beam may be partially cut away to allow one protruding flange portion 38 to support, or be supported by one of the serrations 28, say by serration 28.2. It is noted that passages 39 may be opened in the beam web 36 or beam wall 36 of the structural member 32 to allow unimpeded free flow of the substance, which later solidifies to form the structural material SMT. Free flow of the substance is achieved through the passages 39 of the reinforcement structure 30 and throughout the mold interior 50IN of the mold 50.

Figure 8:
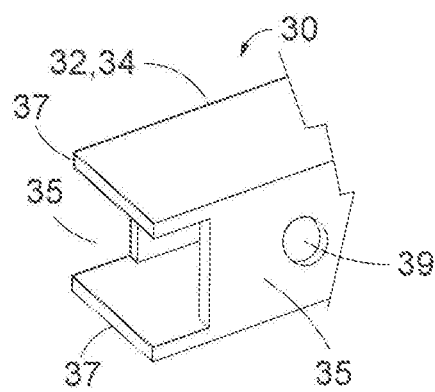
Figure 8A:
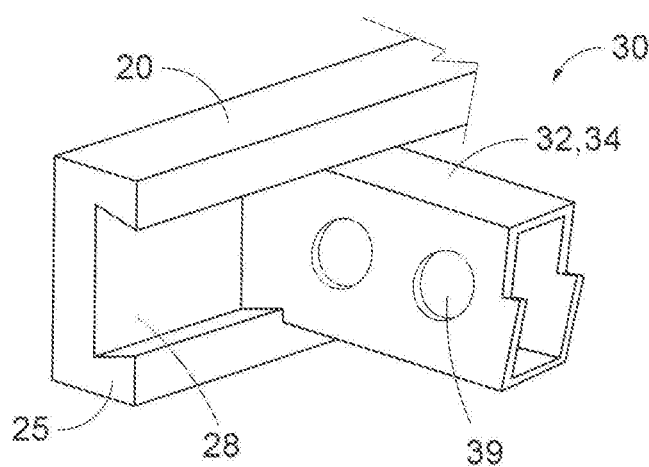

FIG. 8 depicts an example of a reinforcement structure 30 showing the extremity 34 of a structural member 32 formed out of a hollow tube of rectangular cross-section. The side walls 35 of the rectangular beam have been partially cut away to allow the protruding top and bottom wall portions 37 to support, or be supported by for example, the serrations 28.1 and 28.2 of the peripheral belt 20, or by other means. If desired, although not shown in the Figs., the extremity 34 of the hollow rectangular tube may be partially cut away to allow one protruding top or bottom wall portions 37 to support, or be supported by one of the serrations 28, for example by serration 28.2. FIG. 8A illustrates the same hollow rectangular tube but with the extremity 34 being cut perpendicular to the length of the tube and supported by a belt 20 having one serration 28.

The reinforcement structure 30 may be made out of off-the-shelf structural members 32 or built out of structural members having a variable cross-section and a variable rigidity along their length. As shown in FIGS. 7 and 8, the flat surfaces of respectively, the flange portions 38 and the beam bottom wall portion 37, put lower surface pressure on the supporting teeth 25 of the belt 20, and endure lower surface pressure from a load W disposed on the cover C. The same is true for the hollow rectangular tube depicted in FIG. 8A. Furthermore, the reinforcement structure 30 may be built out of various suitable materials, such as for example out of wood, metal, synthetic materials i.e. composite fiber material, or out of a combination of materials.

Figure 9:
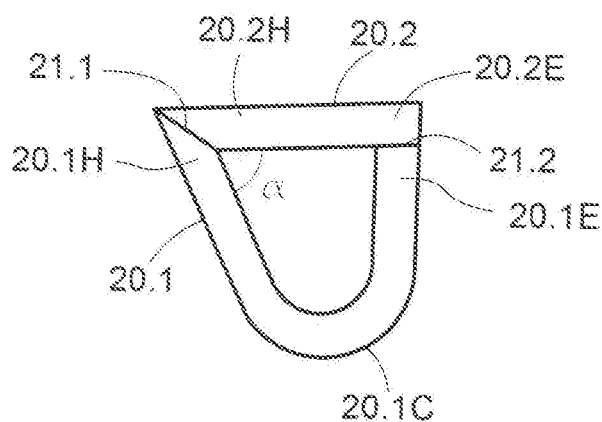
FIG. 9 illustrates examples of embodiments of junctions of a belt.

FIG. 9 illustrates examples of embodiments of junctions 21 of a belt 20 assembled out of two belt portions, namely a first belt 20.1 and a second belt 20.2. The first belt 20.1 and the second belt 20.2 may have a first junction 21.1. A sharp angle α may be formed between a first belt head 20.1H which is cut in the first belt 20.1, and a first belt head 20.2H which is cut in the second belt 20.2. The two belt heads 20.1H and 20.2H may be firmly coupled together by one or more selected belt-fastening mechanisms, including: by the structural material SMT, and/or by glue, and/or by a wedge 23, or by other clamping means. Similar belt-fastening mechanisms may be applied to the second junction 21.2.

Figure 10:
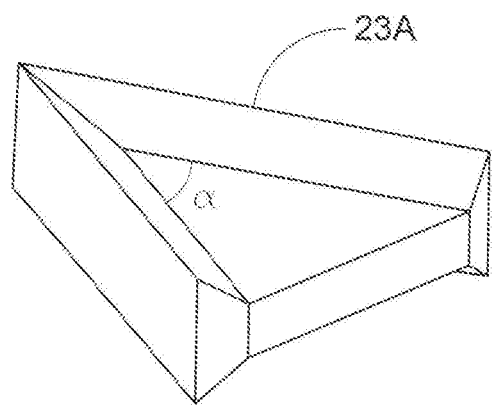
FIG. 10 shows a wedge.

By a first exemplary coupling mechanism, the solidified rigid structural material SMT that penetrates into the serrations 28 of the belts 20, which serrations 28 are not shown in FIG. 9, will hold the belt heads 20.1H and 20.2H firmly attached to each other. By a second exemplary coupling mechanism, the two belt heads 20.1H and 20.2H may be adhesively glued together, permanently or temporarily, at their first junction 21.1. However, temporary coupling may be desired during assembly of the cover elements E of a cover C. FIG. 10 illustrates a wedge 23 that may be used as a third exemplary coupling mechanism, where the two belt heads 20.1H and 20.2H may be fixedly coupled together by use of a wedge 23, here an angle wedge 23A. The angle wedge 23A may have an angle α matching the angle α formed between the first belt head 20.1H of the first belt 20.1 and the first head end 20.2A of the second belt 20.2. The angle wedge 23A is configured to match the serrations 28 of the belts 20 that are coupled together. Each one of these three exemplary coupling mechanisms may be used independently or in combination with one or more other mechanisms to join different belts 20 together, or to join together both ends of a same belt 20. In practice, permanent coupling between belt ends 20E may be provided by the solidified rigid structural material SMT and/or by a reinforcement structure 30.

FIG. 9 further depicts that the belt 20.1 may be bent through a curvature 20.1C and be coupled at the first belt end 20.1E to the second belt end 20.2E of the second belt 20.2 at a second belt junction 21.2. The same exemplary coupling mechanisms described hereinabove with reference to the first junction 21.1 apply also for the second junction 21.2. Evidently, if used, an angle wedge 23A may have an angle selected to match the angle α formed between the second belt 20.2B and the first belt 20.1. A straight portion of an angle wedge 23A may be used as a straight wedge 20S, as shown in FIG. 5.

The thermal insulating properties provided by the solidified closed-cell rigid structural material SMT are intended to prevent heat exchange out of and into the liquid L held in the container 10. Therefore, care is taken to also arrange for proper thermal sealing between the belt(s) 20 of the cover C and the container rim 18 upon which the belt(s) 20 rest(s).

Figure 11:
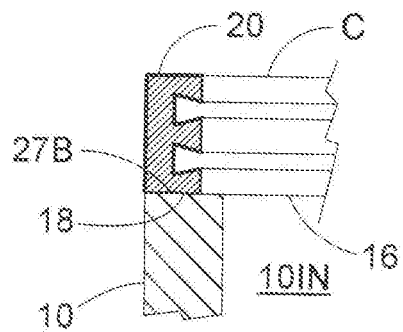
FIG. 11 shows a detail of a cover supported by a container rim.

FIG. 11 shows a detail of an exemplary partial cross-section of a cover C having a belt 20 which is supported by a container rim 18 of a container opening 16. According to the shape and to the material from which the extruded profile of the belt 20 is implemented, the belt bottom 27B may provide a good thermal seal when disposed on the container rim 18.

Figures 12, 13, 14, 15:
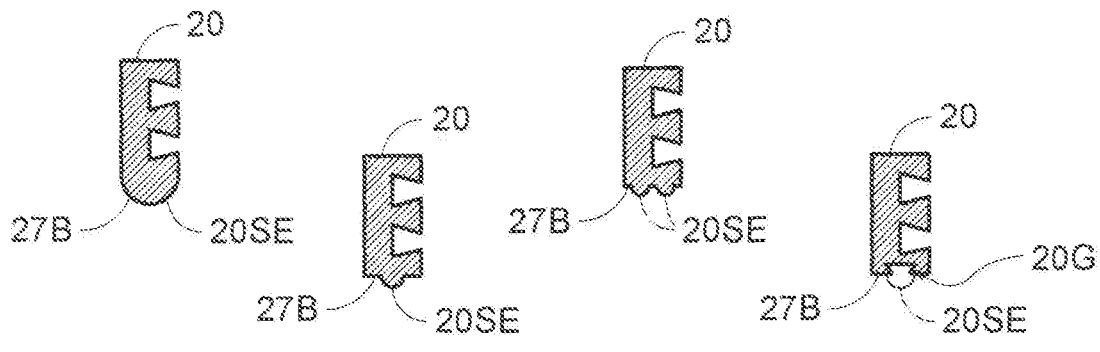
FIGS. 12 to 15 depict sealing methods between peripheral belt and the rim of a cover.

FIGS. 12 to 15 depict belt cross-sections of various profiles configured for providing sealing solutions. FIGS. 12 to 14 show belt cross-sections having at least one sealing element 20SE protruding out of the belt bottom 27B. The one or more sealing elements 20SE may cover the belt bottom 27B completely, as shown in FIG. 12, or cover a portion of the belt bottom 27B as depicted in FIGS. 13 to 15. FIG. 14 illustrates two sealing elements 20SE. FIG. 15 illustrates a longitudinal belt groove 20G entered on the bottom 27B along the length of the belt 20 wherein a sealing element 20SE may be coupled by insertion. This means that a sealing element 20SE may be integral with the belt bottom 27B or be added and coupled thereto. An integral sealing element 20SE may be formed during the extrusion of the belt 20, possibly in co-extrusion, while an added sealing element 20SE may be added by insertion into the groove 20G.

Production of a Single Panel Cover

Figure 24:
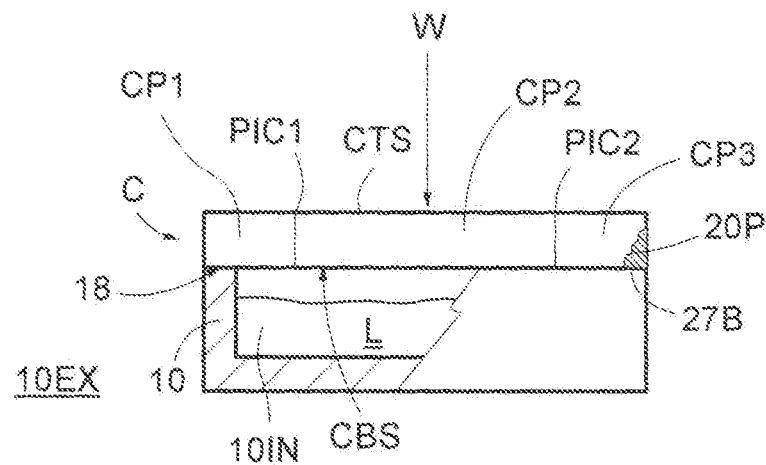
FIG. 24 illustrates a container and a cover having a plurality of cover panels.

The production of a cover C having a single cover panel CP is now considered. Details referring to the production of covers C having more than one cover panel CP, shown in FIG. 24, are provided hereinbelow.

Figure 16:
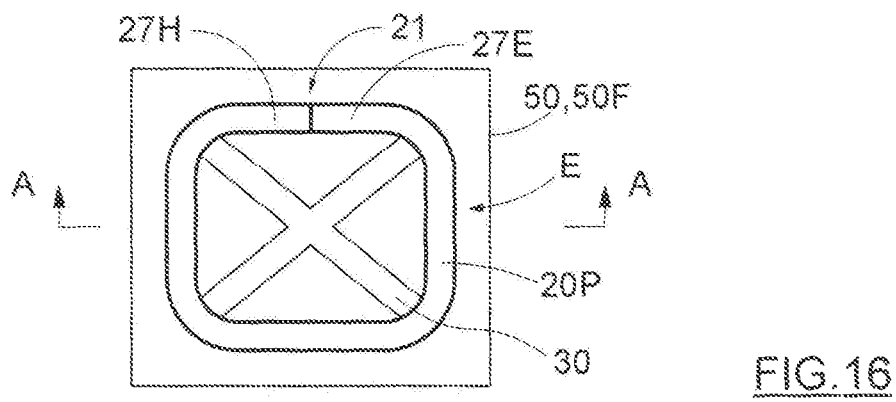
FIGS. 16 and 17 illustrate elements of the cover in the mold.
Figure 17:
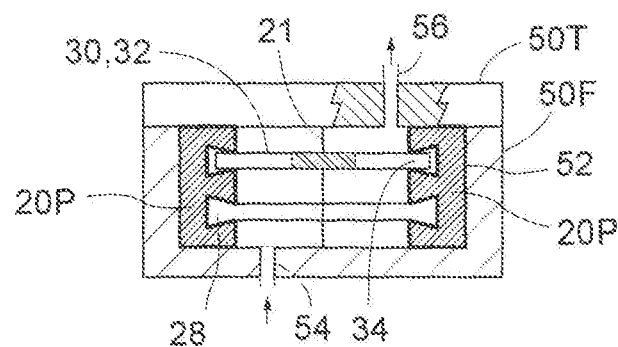

FIG. 16 illustrates a schematic top view of an exemplary female portion 50F of a mold 50 holding therein cover elements E, including a peripheral belt 20P and a reinforcement structure 30. FIG. 17 schematically depicts a cross-section of the mold 50 taken along the cut A-A shown in FIG. 16. In addition, FIG. 17 shows a mold top portion 50T disposed to cover the female portion 50F of the mold 50 before injection therein of the substance for forming the solidified structural material SMT. It is noted that in the exemplary steps of production of the present disclosure, spreading, spraying or otherwise applying adhesive, or a mold release agent is not regarded as a production step and is not described, but may be added with or between the various production steps.

In a first step of production, an at least one peripheral belt 20P is cut to desired length and is/are then inserted in the interior 50IN of the female portion 50F, and on the bottom wall 51 of the open mold 50. The peripheral belt 20P is disposed in snug fit with the interior of the mold walls 52. However, the at least one peripheral belt 20P may be received already cut to length, or be cut to desired length, even in situ, and be inserted in the interior 50IN of the female portion 50F on the bottom wall 51, in snug fit with the mold walls 52. The belt head 27H abutting the belt end 27E, at the belt junction 21, may be glued or be coupled by use of one or more wedge(s) 23, not shown in FIGS. 16 and 17, either prior to or after insertion on the bottom wall 51 of the female portion 50F.

In a second step of production, the reinforcement structure 30 may be coupled to the belt 20 by insertion of the end extremities 34 of the structural members 32 in one or more serration(s) 28. The end extremities 34 of the structural members 32 may be coupled to the belt 20 either before introduction of the belt 20 into the female portion 50F of the mold 50 or thereafter. Coupling of the end extremities 34 to a belt 20 before introduction in the female portion 50F is straightforward. If desired, the belt 20 may be supplied already coupled to the reinforcement structure 30 prior to insertion in the female portion 50F on the bottom wall 51 of the mold 50. The reinforcement structure 30 may be provided as individual structural members 32 or as a prefabricated built structure.

FIGS. 18A to 18F illustrate an exemplary coupling process of a structure 30 to a belt 20 which is already disposed in an open female portion 50F of the mold 50. Coupling of the structure end extremities 34 to a belt 20 is achieved by substantial vertical introduction under controlled force and controlled structure attitude, of the reinforcement structure 30 into the open female portion 50F. Advantage is taken of the selectable flexibility of the belt 20, or portions thereof, which belt 20 may be made out of one material or be coextruded out of more than one and different material. Extrusion or co-extrusion of the belt 20 permits control of the degree of flexibility of the various portions of the belt 20 including, as shown in FIG. 3, the belt back 22, the belt teeth 25, the belt top 27T, and the belt bottom 27B. The spatial attitude orientation of the reinforcement structure 30 relative to the open female portion 50F may be controlled to facilitate introduction into the belt 20. This means that instead of introducing the reinforcement structure 30 parallel to the top portion 20T of the belt 20, a slight initial angle given to the structure 30 relative to the belt 20 may help with the coupling process. Upon descent of the reinforcement structure 30, such a small initial angle, which is not shown in the Figs., will initially deflect only a portion of the upper tooth 25.1 of the belt 20. For further entry into the belt 20, the attitude orientation of the structure 30 may be brought parallel to the top 27T.

Figure 18A:
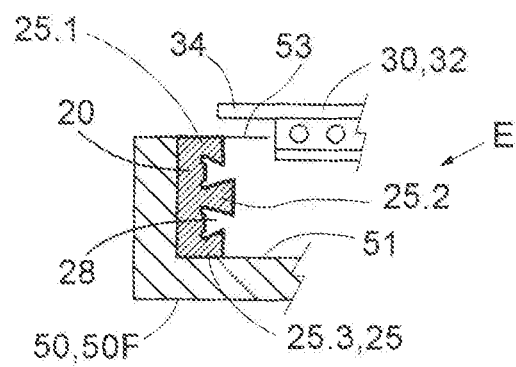
FIGS. 18A to 18F illustrate the coupling process of a structure to a belt.

FIG. 18A depicts a partial cross-section of the female portion 50F of the mold 50, of an exemplary embodiment of a belt 20, and of a reinforcement structure 30. The belt 20 is disposed in the female portion 50F, and the structural member 32 of the reinforcement structure 30 is shown prior to insertion in the female portion 50F. The structural member 32 may have a machined end extremity 34, as described hereinabove regarding an I-beam shown in FIG. 7, or may not need such a machined end extremity 34, such as for a tube shown in FIG. 8. The reinforcement structure 30 may be selected as one or more single structural members 32 as shown in FIGS. 2 and 4, or as a grid of rods of tubes or as a truss structure, as shown in FIGS. 6 and 16, or as another desired reinforcement structure 30 which is not shown in the Figs.

Figure 18B:
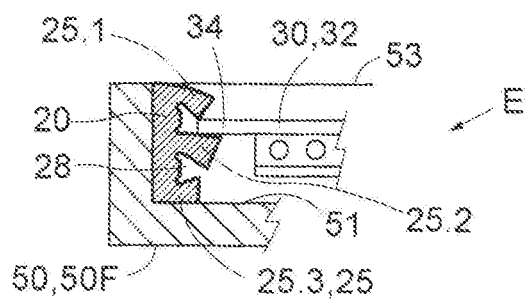

In FIG. 18B, the end extremity 34 of the structural member 32 is shown to have been pushed to enter past the female mold opening 53 and into the belt 20. In FIG. 18B, the end extremity 34 has bent the first belt tooth 25.1, and has progressed past thereof and deep enough to deflect the second belt tooth 25.2. It is noted that the rigidity of the belt teeth 25 that create the serrations 28 therebetween is dependent on the shape and on the single or more materials from which the belt 20 is made. Therefore, for example, the second belt tooth 25.2 may be rigid enough to arrest the insertion under controlled force, of the reinforcement structure 30 into the female portion 50F of the mold 50. Alternatively, the belt teeth 25 may be designed and shaped to permit the introduction of the reinforcement structure 30 until stopped by a selected belt tooth 25, or stopped during assembly at the appropriate location.

Figure 18C:
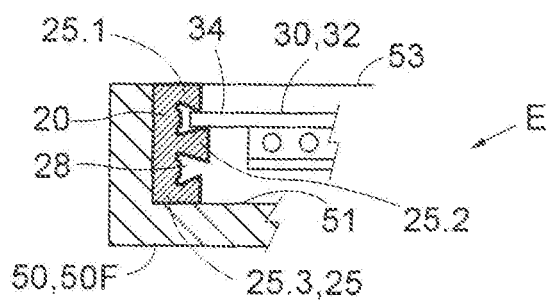

In FIG. 18C, the end extremity 34 has progressed further into the mold 50, just enough to release the first belt tooth 25.1, which will regain the original unbent disposition. Simultaneously, the application of the controlled force pushing the reinforcement structure 30 into the female portion 50F may be stopped at a predetermined depth of insertion into the belts 20, such that the second belt tooth 25.2 will regain the original unbent disposition. As a result, the end extremities 34 will be securely retained in the selected serration 28. At this point, it may be said that the bottom wall 51 of the female portion 50F supports the belt 20, while the belt 20 and the reinforcement structure 30 are mutually self-supporting.

Figure 18D:
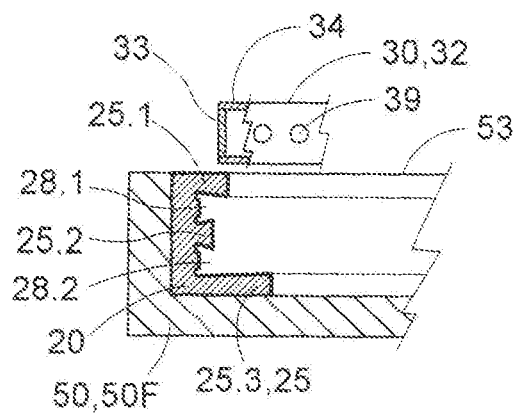

FIG. 18D depicts a partial cross-section of the female portion 50F of the mold 50 and an exemplary embodiment of a belt 20, as well as a reinforcement structure 30. As before, the belt may have two belt teeth 25 as in FIG. 8A or three belt teeth 25 as in FIG. 18A to 18F for example. In FIG. 18D, the belt 20 is disposed in the female portion 50F, and the structural member 32 of the reinforcement structure 30 is shown prior to insertion in the female portion 50F of the mold 50. The structural member 32 may be selected for example as a hollow rectangular beam having an end extremity 34 which is closed by a lid 33 as well as open passages 39 for the passage therethrough of the substance that will form the solid structural material SMT.

Figure 18E:
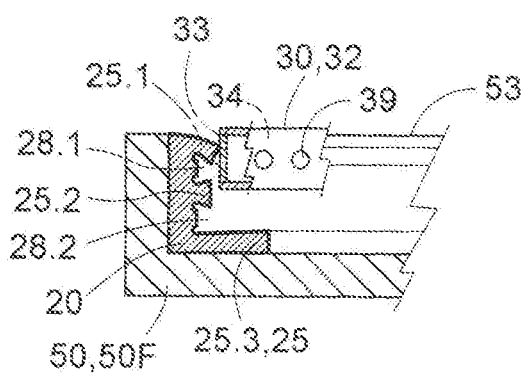

In FIG. 18E, the end extremity 34 of the structural member 32 is shown to have been pushed to enter past the female mold opening 53 and into the belt 20: the end extremity 34 has bent the first belt tooth 25.1, and has progressed past thereof and deep enough to slide along the second belt tooth 25.2 but has not yet reached the third belt tooth 25.3.

Figure 18F:
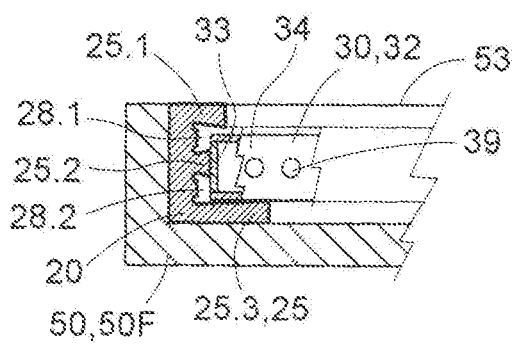

In FIG. 18F, the end extremity 34 has progressed further into the mold 50, just enough to release the first belt tooth 25.1, which will regain the original unbent disposition. Simultaneously, the application of the controlled force pushing the reinforcement structure 30 into the female portion 50F may be stopped when the end extremities 34 become supported by the third belt tooth 25.3. At this stage, the end extremities 34 are seated on the third belt tooth 25.3 and the closure lid 33 is supported by the second belt tooth 25.2. This is to say that the closure lids 33 supports the shape and the integrity of the belt 20 and that the reinforcement structure 30 supports the shape of the cover C to which it provides a load bearing capability. At this point, it may be said that the female portion 50F of the mold 50 supports the belt 20, while the belt 20 and the reinforcement structure 30 are mutually self-supportive.

The cover elements E, including the belt 20 and the reinforcement structure 30, are configured for insertion and assembly into the open female mold 50F in a direction substantially perpendicular the female mold opening 53 for enhancement of automatic and/or robotic ease of assembly. Automatic, robotic or manual assembly may be performed under application of controlled force. Automatic assembly may be provided by dedicated production equipment conducting assembly in the mold 50, operation of the mold 50, and controlled injection of the substance. Robotic assembly may be accepted as operating with multipurpose robot arm(s) and may be controlled by cameras in association with mold operating and substance injection equipment. The terms automatic or robotic may be interchanged and refer to non-manual production. Such automatic production equipment is well known to those skilled in the art and needs not to be described in detail.

In a third and last step of production of the cover C, and with reference to FIG. 17, the at least one selected substance that solidifies to form the structural material SMT is injected into the closed mold 50, via at least one injection nozzle 54. Likewise, at least one vacuum port 56 may draw air out of the closed mold 50 as well as excess substance or structural material SMT. Both the at least one injection nozzle 54 and the at least one vacuum port 56 are disposed in the mold 50 in a distribution/location known to those skilled in the art. An injection nozzle 54 and a vacuum port 56 may pass through a portion of a belt 20, for example respectively through the belt back 22 and the belt top 27T, as depicted in the cross-sections of the belt 20 shown in FIGS. 19 and 20. After injection of the at least one substance selected to form the structural material SMT, and once this last one has solidified, the injection nozzle 54 and the vacuum port 56 may be retrieved out of the mold 50, the mold 50 may be opened and the cover C may be ejected or retrieved thereout, as a finished product ready for use. The structural material SMT may solidify to form a lightweight closed-cell cover C having a solid impact and abrasion resistant outer shell.

Retrieval or ejection of the cover C out of the mold 50 is performed in a direction substantially perpendicular opposite the female mold opening 53, thus in a direction opposite to the direction of assembly of the cover elements E in the mold 50. The direction of assembly being contrary to the direction of removal of the cover C away from the mold 50 enhances automatic and/or robotic assembly and production. The cover elements E, namely the belt 20, the reinforcement structure 30 and the substance, as selected, that solidifies to form the structural material SMT, are mutually integrated and form a self-supporting cover C of composite structure offering a rigid and sturdy but lightweight cover structure. The cover C is free of or void of mechanical fasteners such as pins, dowels, studs, rivets, bolts, screws, or nuts. Adhesives and wedges 23 are not regarded as being a mechanical fastener. Thus, the assembly of a cover C is free of, or void of, mechanical fasteners, which is beneficial for automatic and/or robotic assembly and production.

Production of a Foil-Covered Single Panel Cover

A further cover element E, such as a foil F, may envelop the cover C as an additional protection against wear and tear. The foil F may be selected as a wear, tear, and abrasion-resistant, thermal insulating, and water-tight material such as a polyurethane based material for example.

Figure 22:
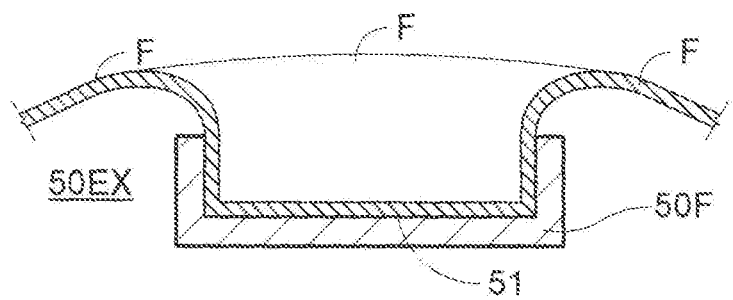
FIG. 22 depicts a film-covered single cover panel wrapped in a foil.

FIG. 21 illustrates an exemplary schematic embodiment of the cover C enveloped by a foil F. FIG. 21 depicts a partial cross-section of the female portion 50F of a mold 50 closed with a top portion 50T showing the foil F and the peripheral belt 20P which covers and hinders view of the solidified structural material SMT wherein the reinforcement structure 30 is embedded. The peripheral belt 20B and the foil F may protect the cover C and prevent abrasion and damage to respectively, the cover periphery CPR, the cover top side CTS, and the cover bottom side CBS. The production of a cover C enveloped by a foil F is similar to that of a cover C without a foil F. With reference to FIG. 22, the production of a film-covered single cover panel C wrapped in a foil F is now considered.

In contrast with the production steps described hereinabove regarding a cover C without a foil F, for a foil-covered single panel cover C, there is need for a preliminary production step prior to the first production step. As a production step preliminary to the first production step described hereinabove for a cover C without a foil F, the foil F is disposed on the bottom wall 51 of the open female portion 50F, as shown in FIG. 22. Portions of the foil F sufficient to later be folded over, and to later envelope the cover top side CTS of the cover C, shown in FIG. 21, remain temporarily disposed on the exterior 50EX of the open female mold 50F. Thereafter, the first and the second step for the production of the cover C described hereinabove for a cover C without a foil F are performed. However, prior to the end of the second production step for a cover C without a foil F, the foil F is folded and stretched over the belt(s) 20 and is disposed and may be stretched to completely wrap and envelope the to be formed cover C, after injection of the substance forming the structural material SMT.

In the first step of production of the film-covered single panel cover C, the peripheral belt 20P is cut to desired length or may be provided cut to length a priori. Then, the peripheral belt 20 is inserted in the interior 50IN of the female portion 50F on top of the film F which is disposed on the bottom wall 51 of the open mold 50 and in snug fit with the film F covering the interior of the mold walls 52. The film F is shown in FIG. 21 but not in FIGS. 18A to 18F. The peripheral belt 20P may be cut to the required length for the belt head 27H to abut the belt end 27E at the junction 21. The substance, as selected, which will solidify to form the structural material SMT, once injected into the mold 50, may firmly hold the belt 20 together. At the junction 21, the belt head 27H and the belt end 27E may be glued or coupled by use of a wedge 23, which is not shown in FIGS. 16 and 17, prior to or after insertion in the female bottom mold portion 50F, on the bottom wall 51.

In the second step of production of the cover C enveloped by a foil F, the reinforcement structure 30 may be coupled to the belt 20 by insertion of the end extremities 34 of the structural members 32 in one or more serration(s) 28. If desired, the belt 20 may be supplied already coupled to the reinforcement structure 30 prior to insertion in the female mold portion 50F on the bottom wall 51. The reinforcement structure 30 as provided may include individual structural members 32 or a prefabricated built structure.

FIGS. 18A to 18F illustrate the coupling process of a structure 30 to a belt 20 which is already disposed in an open female portion 50F of the mold 50. The belt 20 is disposed on top of the film F which is spread on the bottom wall 51 of open female mold portion 50F. The film F is shown in FIG. 21 but not in FIGS. 18A to 18F. Coupling of the structure end extremities 34 to a belt 20 is achieved by substantial vertical introduction under controlled force and controlled structure attitude orientation of the reinforcement structure 30 into the open female portion 50F. Advantage may be taken of the selectable flexibility of the belt 20, or of portions thereof, which belt 20 may be made out of one material or be coextruded out of a plurality of different materials. Extrusion or co-extrusion of the belt 20 permits control of the degree of flexibility of the various portions of the belt 20 including for example, as shown in FIG. 3, the belt back 22, the belt teeth 25, the belt top 27T, and the belt bottom 27B. The controlled attitude orientation of the reinforcement structure 30 relative to the open female mold opening 53 may be controlled to facilitate introduction thereof into the belt 20. This means that instead of introducing the reinforcement structure 30 parallel to the top portion 20T of the belt 20, a slight initial angle, not shown in the Figs., that is given to the structure 30 relative to the belt 20 may help and ease introduction. Upon descent of the reinforcement structure 30, such a small initial angle, which is not shown in the Figs., will initially deflect only a portion of the upper tooth 25.1 of the belt. For further entry into the belt 20, the attitude of the structure 30 may be brought parallel to the top 27T.

FIG. 18A depicts a partial cross-section of the female portion 50F of the mold 50, of an exemplary embodiment of a belt 20, and of a reinforcement structure 30, but the film F upon which the belt 20 is disposed is not shown. The film F upon which the belt 20 is disposed is shown in FIG. 21 but not in FIGS. 18A to 18F. The belt 20 is thus disposed on top of the film F, and the structural member 32 of the reinforcement structure 30 is shown prior to insertion in the female portion 50F of the mold 50. The structural member 32 may have a machined end extremity 34 as described hereinabove with respect to an I-beam shown in FIG. 7, or to a tube shown in FIG. 8. The reinforcement structure 30 may be selected as one or more single structural members 32 as shown in FIGS. 2 and 4, or as a grid of rods or of tubes or as a truss structure, as shown in FIGS. 6 and 16, or as another desired reinforcement structure 30 which is not shown in the Figs.

In FIG. 18B, the end extremity 34 of the structural member 32 is shown to have been pushed to enter past the female mold opening 53 and into the belt 20. The end extremity 34 has bent the first belt tooth 25.1, and has progressed past thereof and deep enough to deflect the second belt tooth 25.2. It is noted that the rigidity of the teeth 25 that create the serrations 28 therebetween is dependent on the shape and on the single or more materials from which the belt 20 is made. Therefore, for example, the second tooth 25.2 may be rigid enough to arrest the insertion, under controlled force, of the reinforcement structure 30 into the female portion 50F of the mold 50. Alternatively, the teeth 25 may be designed and shaped to permit the introduction of the reinforcement structure 30 until stopped by a selected tooth 25, or stopped at a predetermined depth of insertion.

In FIG. 18C the end extremity 34 has progressed further into the mold 50, just enough to release the first belt tooth 25.1, which will regain the original unbent disposition. Simultaneously, the application of the controlled force pushing the reinforcement structure 30 into the female mold portion 50F may be stopped at a predetermined depth of insertion into the belts 20 into the female mold 50F, such that the second belt tooth 25.2 will regain the original unbent disposition. As a result, the end extremities 34 will be securely retained in the selected serration 28. At this point, it may be said that the bottom wall 51 of the female mold 50F supports the film F and the belt 20, while the belt 20 and the reinforcement structure 30 are mutually self-supporting.

FIG. 18D depicts a partial cross-section of the female mold portion 50F of the mold 50 wherein a foil F is disposed, and shows an exemplary embodiment of a belt 20 and of a reinforcement structure 30. As before, the belt 20 may have two belt teeth 25 as in FIG. 8A, or three belt teeth 25 as in FIGS. 18A to 18F for example. In FIG. 18D, the belt 20 is disposed in the female mold portion 50F, and the structural member 32 of the reinforcement structure 30 is shown prior to insertion in the female portion 50F of the mold 50. The structural member 32 may be selected for example as a hollow rectangular beam having end extremity 34 closed by a lid 33 as well as open passages 39 for the passage therethrough of the substance that solidifies to form the structural material SMT.

In FIG. 18E, the end extremity 34 of the structural member 32 is shown to have been pushed to enter past the female mold opening 53 and into the belt 20: the end extremity 34 has bent the first belt tooth 25.1, and has progressed past thereof and deep enough to slide along the second belt tooth 25.2 but has not yet reached the third belt tooth 25.3.

In FIG. 18F, the end extremity 34 has progressed further into the female mold portion 50F, just enough to release the first belt tooth 25.1, which will regain the original unbent disposition. Simultaneously, the application of the controlled force pushing the reinforcement structure 30 into the female portion 50F may be stopped when the end extremities 34 become supported by the third belt tooth 25.3. At this stage, the end extremities 34 are seated on the third belt tooth 25.3 and the closure lid 33 supports the second belt tooth 25.2. This is to say that the closure lids 33 support the shape and the integrity of the belt 20. At this point, it may be said that the female portion 50F of the mold 50 supports the foil F while the belt 20 and the reinforcement structure 30 are mutually self-supporting.

Before the end of the second production step, the foil F is folded and stretched between and over the belt(s) 20 and is disposed to completely wrap and envelope the to be formed cover C, as shown in FIG. 21 which is a cross-section of the closed mold 50 showing the cover C.

The cover elements E, including the belt 20 and the reinforcement structure 30, are configured for insertion and assembly into the open female mold portion 50F in a direction substantially perpendicular the female mold opening 53 for enhancement of automatic and/or robotic ease of assembly. Automatic, robotic or manual assembly may be performed under application of controlled force.

Figure 23:
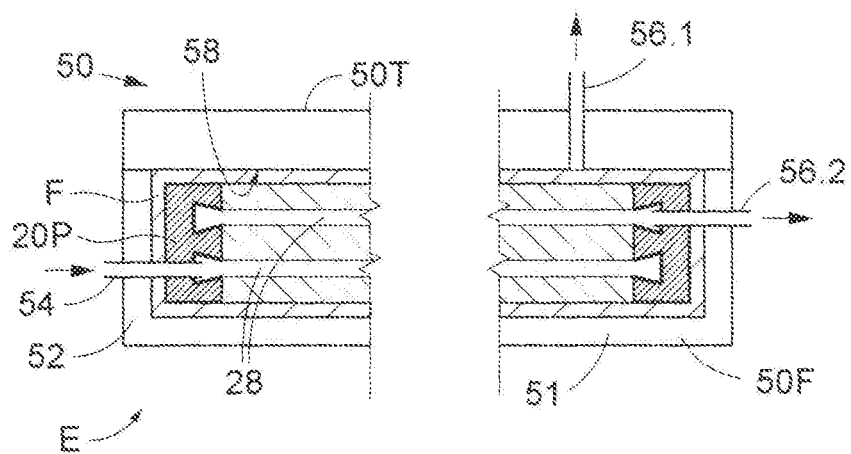
FIG. 23 shows elements of the cover in the mold prior without structural material.

For the third and last step of production of the cover C enveloped by a foil F, reference is made to FIG. 23. FIG. 23 depicts a schematic cross-section of the mold 50 with a portion of the cover elements E of the cover C as disposed in the mold 50 prior to injection therein of the at least one selected substance that solidifies to form the third cover element E, which is the structural material SMT. The cover elements E disposed in the female mold portion 50F include the peripheral belts 20P, the central belts 20CB, the reinforcement structure 30, the film F, and the to be injected substance which forms the structural material SMT, but only the peripheral belts 20P and the film F are shown for the sake of clarity. The at least one selected substance is injected into the closed mold 50, via at least one injection nozzle 54. Likewise, at least one vacuum port 56 may draw air out of the closed mold 50, as well as excess substance or structural material SMT. Both the at least one injection nozzle 54 and the at least one vacuum port 56 are disposed in the mold 50 in a distribution and location known to those skilled in the art. An example regarding the passage of an injection nozzle 54 and of a vacuum port 56 into the mold 50 is depicted as a detail of the partial cross-sections of the belt 20 shown in FIGS. 19 and 20. After injection of the at least one selected substance, and once this last one has solidified into a structural material SMT, the injection nozzle(s) 54 and the vacuum port(s) 56 may be retrieved out of the mold 50, the mold 50 is opened and the cover C may be retrieved or ejected thereout, as a finished product ready for use. The structural material SMT is solidified to form a rigid lightweight closed-cell foamed cover C which is enveloped by a film F providing an impact and abrasion resistant exterior cover shell.

In FIG. 23, an exemplary injection nozzle 54 is shown to pass through a wall 51 of the female mold portion 50F, through the film F and through the peripheral belt 20P. Two vacuum ports 56, namely a first vacuum port 56.1 and a second vacuum port 56.2, may be disposed to draw air out of the closed mold 50. To begin with, the first vacuum port 56.1 may exert a first vacuum pressure to cause the film F to cling to the interior wall 58 of the top portion 50T of the mold 50. Thereafter, the second vacuum port 56.2 may exert a second vacuum pressure, lower than the first vacuum pressure, to empty air and excess substance or foam out of the interior 50IN of the female mold 50F. However, the difference in vacuum pressure causes the film F to cling to the interior of the walls 52 of the mold 50.

Retrieval or ejection of the cover C out of the mold 50 is performed in a direction substantially opposite the insertion direction into the female mold opening 53, thus in a direction opposite to the direction of introduction of the cover elements E into the female mold portion 52F. The direction of assembly being contrary to the direction of removal of the cover C away from the mold 50 enhances automatic and/or robotic assembly and production. The cover elements E, namely the belt 20, the reinforcement structure 30, the film F and the selected substance that solidifies to form the structural material SMT, are mutually integrated and form a self-supporting cover C of composite structure offering a rigid and sturdy but lightweight cover structure. The cover C is free or void of mechanical fasteners such as pins, dowels, studs, rivets, bolts, screws, or nuts, which lack of mechanical fasteners is beneficial for automatic and/or robotic assembly and production Plural Panels Cover The cover C described hereinabove, may be implemented out of materials being lightweight enough to be easily handled manually by one person to cover the container opening 16 or be removed away therefrom. The same may be true for a cover C having two or three cover panels for a household size container 10, such as for a sauna or a Jacuzzi for example. However, once a cover C of large dimensions is removed from the container opening 16, storage thereof may be difficult. As a remedy, the same methods and principles used for the production of the single panel cover C described hereinabove may be used to implement a cover having a plurality of cover panels CP. By the addition of a common pivotal coupling PIC operative both as a hinge element and as an element for coupling together two or more different cover panels CP, it becomes possible to fold the cover C. In addition to the ability to fold the cover C for ease of stowage, this folding feature allows a partial opening of the container C without having to expose the entirety of the container opening 16 and thus the entirety of the liquid L contained therein.

FIG. 24 illustrates a schematic partial cross-section of a side elevation of a container 10 which is covered by a cover C having a plurality of cover panels CP with for example, three cover panels respectively CP1, CP2 and CP3. The cover C has a cover top side CTS and a cover bottom CBS which covers the container 10, and may have a rectangular, circular or other desired top elevation geometric shape. Further cover elements E, such as a first pivotal coupling PIC1 and a second pivotal coupling PIC2 may form a hinge and couple between two or more different cover panels CP. Pivotal couplings PIC may be disposed along preferred or desired directions, not necessary parallel to or along lines or axes of symmetry, but such pivotal couplings PIC may not intersect each other. In FIG. 24, the cover panel CP1 may rotate clockwise through 180° about the pivotal coupling PIC1, and the cover panel CP3 may rotate anticlockwise through the same angle about the pivotal coupling PIC2, where cover panels CP1 and CP3 rotate respective toward and over the cover panel CP2.

Figure 25:
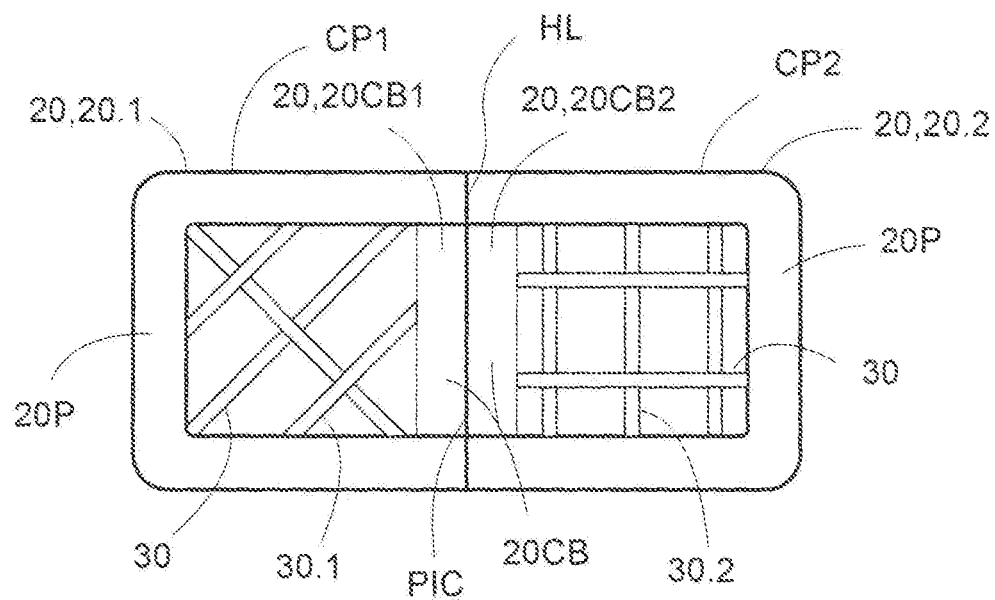
FIG. 25 depicts an embodiment of a cover showing belts and a reinforcement structure.

FIG. 25 depicts a plan view of an exemplary schematic embodiment of a cover C showing belts 20 and the reinforcement structure 30, but without showing the solidified foamed structural material SMT. The cover C has a first cover panel CP1 which is disposed adjacent a second cover panel CP2. A pivotal coupling PIC, shown schematically as a line HL, hinges and pivotally couples together between the first cover panel CP1 to the second cover panel CP2. Each cover panel CP1 and CP2 may have respectively, a first peripheral belt 20.1 coupled to a first central belt 20CB 1, and a second peripheral belt 20.2, which is coupled to a second central belt 20CB2. Each one of the first cover panel CP1 and the second cover panel CP2 may have a different top elevation shape, not shown in FIG. 25, accommodated to match a respective container opening 16. Likewise, each one of the first cover panel CP1 and the second cover panel CP2 may have a different volume of structural material SMT, and may be built to support different loads W. As shown in FIG. 25, the reinforcement structure 30.1 of the first cover panel CP1 and the reinforcement structure 30.2 of the second cover panel CP2 are different. The end extremities 34 of the structural members 32 that are engaged with the peripheral belts 20P which are disposed over the container rim 18 shown in FIG. 24, may be better suited to carry loads W. However, the end extremities 34 of the structural members 32 engaging the central belts 20CB may be better suited to support the shape of the cover C.

A cover C including one or more cover panels CP may be configured to carry a range of loads W. For domestic containers 10 such as a Jacuzzi for example, one may consider the load of a child or that of an adult person. In an industrial environment, maintenance personnel with or without additional equipment may need to have access to the cover C and may thereby apply a substantial load W on the cover C. A cover C may thus be custom-made to requirements, to support a load of say, up to 100 kg, up to 250 kg, or even more.

The solidified foamed structural material SMT covering the reinforcement structure 30 is not shown in FIG. 25 for the sake of clarity. As described hereinabove, the cover elements E including belts 20, reinforcement structures 30, and rigid foamed structural material SMT, form one integral mutually self-supporting entity, where each element features multipurpose functions. For example, the belts 20 and the reinforcement structure 30 are mutually supportive and so are the foamed rigid structural material SMT, the belts 20, and the reinforcement structure 30.

FIGS. 24 and 25 are referenced to again. To prevent heat exchange between the liquid L and the container exterior 10EX, the belt bottom 27B of the peripheral belts 20P, which are supported by the container rim 18, seal-off the container interior 10IN from the container exterior 10EX, and practically form a continuous seal. In contrast therewith, the belt bottom 27B of the central belts 20CB, not shown, which is not supported by a container rim 18 may not require such a belt-bottom seal. The container 10 is practically covered and bound by the peripheral belts 20P which in FIG. 25 are mutually and hingedly coupled together by the pivotal coupling PIC which is represented by the schematic hinge line HL. The two central belts 20CB, disposed on each side of the schematic hinge line HL are indicated as 20CB1 and 20CB2.

Figure 26:
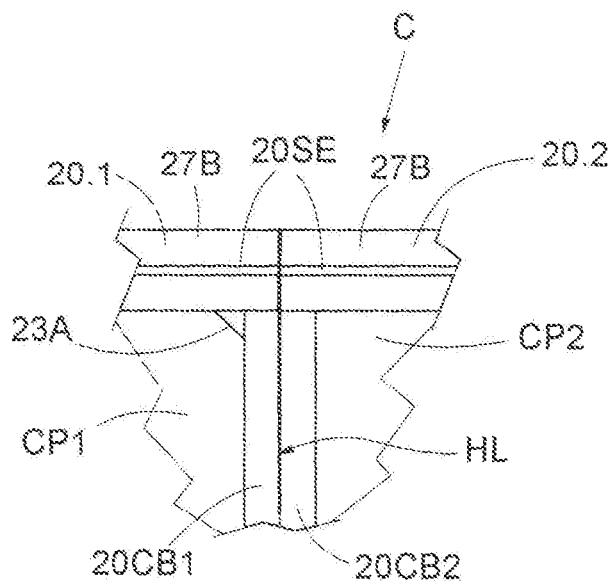
FIG. 26 depicts a detail of a bottom view of a cover.

To ensure good thermal sealing properties, the bottom portion 27B of the peripheral belts 20.1 and 20.2 may be configured as described hereinabove in paragraph 19 with respect to FIGS. 12 to 15. FIG. 26 depicts a detail of a bottom view of a cover C showing the respective bottom portions 27B of the peripheral belts 20.1 and 20.2 as well as of the respective central belts 20CB 1 and 20CB2 pertaining to the two cover panels, namely CP1 and CP2.

The bottom portions 27B carry a seal 20SE that is disposed on both peripheral belts 20.1 and 20.2, which seal 20SE may be selected for example from the description referring to FIGS. 12 to 15 in paragraph 19. The seal 20SE which may be disposed along the peripheral belts 20.1 and 20.2 is practically uninterrupted and therefore heath transfer between the liquid L held in the container interior 10IN and the container exterior 10EX shown in FIG. 1, is minimized. For ease of assembly and manufacture, it may be preferable to provide a seal SE that is integrated into a belt 20, thus to provide a belt 20 including a seal 20SE, where the belt 20 and the seal 20SE are made as a unitary one-piece unit. Such a belt 20 with an integral seal 20SE may be implemented by use of a co-extrusion manufacturing process by which a desired belt profile is achieved in a one shot manufacturing process. Thereby it is possible to handle a belt 20 with an integral seal 20SE as a single unitary part. This is contrary to one belt 20 and one seal 20SE that have to be assembled, as shown in FIG. 15 for example, where the belt bottom 27B requires insertion of the seal 20SE in the groove 20G. Hence, one may avoid the need for assembly of two separate parts. This means not only fewer parts, thus fewer parts to assemble, but furthermore, such a configuration alleviates and enhances automatic and/or robotic assembly and even manual assembly processes.

Figure 27:
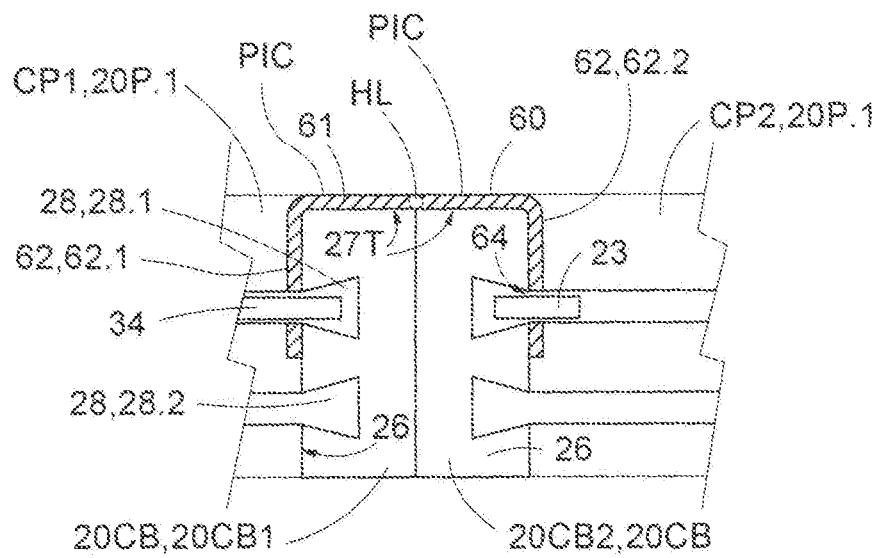
FIG. 27 shows a pivotal coupling element coupling between two panels of a cover.
Figure 28:
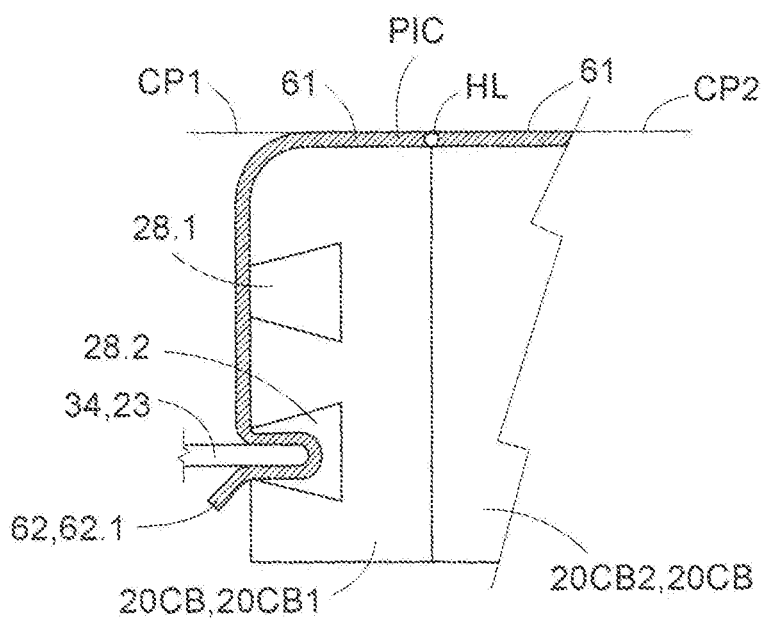
FIG. 28 illustrates a pivotal coupling element for covering the two serrations of a central belt.

FIGS. 27 and 28 show a schematic representation of a pivotal coupling element PIC which may be used for hingedly coupling between two panels CP1 and CP2 of a cover C. There is shown a partial cross-section cut perpendicular through the central belts 20CB1 and 20CB2 pertaining to, respectively, the first cover panel CP1 and the second cover panel CP2 of a cover C. The pivotal coupling element PIC is stretched over and covers the belt top 27T and at least a portion of the serrated side 26 of both central belts 20CB1 and 20CB2. The pivotal coupling element PIC may cover the length of the two central belts 20CB 1 and 20CB2 which are coupled together thereby, and allows the first cover panel CP1 and a second cover panel CP2 to pivot relative to each other about a longitudinal hinge line HL.

The pivotal coupling element PIC may be implemented as a thin piece of flexible and pliable high-strength material, i.e. a piece of cloth or of film, made from a material appropriately selected to fold along the hinge line HL. If desired, the back portion 61 of the pivotal coupling element PIC may be glued to the belt top 27B of the belts 20CB. The pivotal coupling element PIC may be chosen for example as a piece of Kevlar cloth which may be pre-treated. Kevlar is a Trademark.

The pivotal coupling element PIC may be disposed on and stretched over the central belts 20CB1 and 20CB2 to take the shape of an inverted letter "U" with a roof portion 60 and a skirt portion 62 having a first skirt portion 62.1 with a first length on the side of the central belts 20CB 1 and a second skirt portion 62.2 having a same or a different length on the side of the central belts 20CB2.

It is noted that the pivotal coupling element PIC is operative in both cases: When the geometry of the serrations 28 of the peripheral belts 20P.1 and 20P.2 is the same as the serrations 28 of the central belts 20CB1 and 20CB2, and when those serrations 28 are different. This means that the shape, the number of serrations 28 and size of the belt teeth 25 of the peripheral belts 20P.1 and 20P.2 may be the same or may be different from those of the central belts 20CB1 and 20CB2. The central belts 20CB1 and 20CB2 may have one or more serrations 28. Even though FIG. 27 shows two such serrations 28, namely 28.1 and 28.2, at least one serration 28 may be necessary. Moreover, one central belt 20CB may have a first number of serrations 28 and the other central belt 20CB may have a different number of serrations 28. In addition, although not shown in FIGS. 27 and 28, the length of the skirt portion 62.1 covering the serration side 28 of the central belt 20CB1 may be the same or different from the length of the skirt portion 62.2 covering the serration side 28 of the central belt 20CB2.

Figure 29:
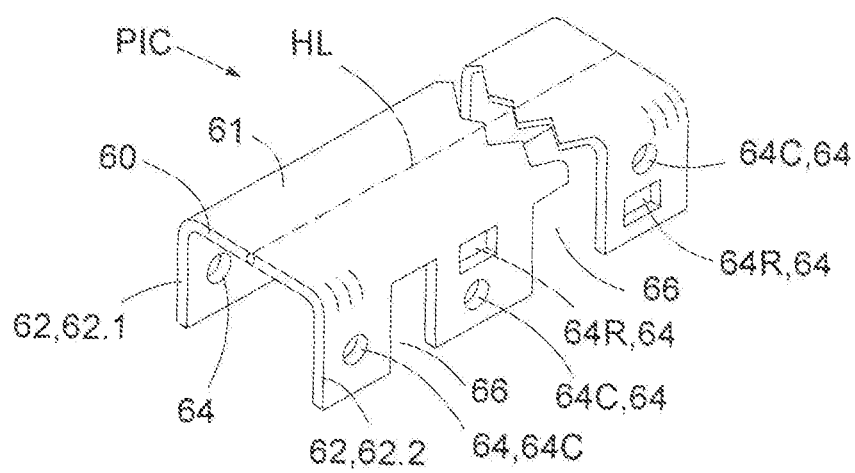
FIG. 29 depicts an embodiment of a pivotal coupling element.

FIGS. 27 to 29 illustrate how the pivotal coupling element PIC may be stretched and firmly coupled to the central belts 20CB1 and 20CB2 by use of various methods and implements. For example, an end extremity 34 of a structural member 32, or a wedge 23 may penetrate through a hinge opening 64, shown in FIG. 29, and into a serration 28, for fixed coupling retention of the pivotal coupling element PIC to the central belts 20CB 1 and 20CB2. Moreover, the back portion 61 of the pivotal coupling element PIC may be glued to the belt top 27B of the belts 20CB. The shape of the openings 64 may differ to match the shape of the end extremity 34 or of a wedge 23. A rectangular hinge opening 64R may be configured to fit a wedge 23 or an end extremity 34 of matching shape. Likewise, a circular hinge opening 64C may be opened to fit an end extremity 34 of matching shape. The pivotal coupling element PIC may have more than one hinge opening 64 along a skirt portion 62 to be disposed along a serrated side 26 of each one of the central belts CB1 and CB2. This may be necessary not only for the sake of redundancy but also to prevent a possible unwanted rotation about an axis perpendicular to the hinge line HL of one cover panel CP1 relative to a second cover panel CP2. Evidently, if desired, the back portion 61 and/or the skirt portion 62 of the pivotal coupling element PIC, or a selected portion thereof, may be glued to the central belts 20CB 1 and 20CB2. Mechanical fasteners such as pins, dowels, studs, rivets, bolts, screws, or nuts, are not needed to couple the pivotal coupling element PIC to the central belts 20CB1 and 20CB2, which complete lack of mechanical fasteners is beneficial for automatic and/or robotic production and even for manual assembly.

FIG. 28 illustrates a partial cross-section of an embodiment of a pivotal coupling element PIC which is selected to cover two serrations 28.1 and 28.2 of a first central belt 20CB 1. FIG. 28 depicts a first length of a skirt portion 62.1 which is fixedly coupled into a second serration 28.2. In an alternative embodiment, a pivotal coupling element PIC may be fixedly coupled to the central belt 20C without having to carry hinge openings 64. For example, an end extremity 34 of a structural member 32 or a wedge 23 may be disposed to forcefully push a portion of the length of the skirt portion 62 and/or 62.1 into a serration 28 to achieve a force fit attachment of the pivotal coupling element PIC to the central belt 20CB.

In FIG. 27, the second length of the skirt portion 62.2 which is disposed on the side of the second cover panel CP2 may be identical or, although not shown in FIG. 27, be different from the first length of the first skirt portion second 62.1. This means that the pivotal coupling element PIC may not necessarily be symmetric about the hinge line HL, may be retained by various methods to the central belts 20CB, and to the one or more serrations 28, in different combinations of configurations.

FIG. 29 depicts an exemplary embodiment of a pivotal coupling element PIC configured for disposition over two central belts 20CB. Hinge openings 64 may be appropriately disposed on the skirt portion 62 of the pivotal coupling element PIC to permit the insertion of, for example, the end extremity 34 of a structural member 32 or of a wedge 23, or of another implement configured to fixedly retain the pivotal coupling element PIC to the central belts 20CB. The number and shape of the hinge openings 64 may be selected as desired and the hinge openings 64 may have a geometrical shape, such as a circular shape 64C or a rectangular shape 64R for example, or another desired geometrical shape. The end extremity 34 of structural members 32, and/or wedges 23, may be inserted through the hinge openings 64 for fastening of the pivotal coupling element PIC in one selected serration 28 or in more serrations. Alternatively, hinge openings are not necessary for coupling the pivotal coupling element PIC to and over two central belts 20CB. This is possible since a skirt 62 may be fixedly retained to a central belt 20B by being pushed therein by an end extremity 34 of structural members 32, and/or by a wedge 23.

Evidently, when a cover C does not require a reinforcement structure 30, a wedge 23 may be used to fixedly attach the pivotal coupling element PIC to a central belt 20CB. The retention of a pivotal coupling element PIC into one serration 28, say serration 28.1, also allows a wedge 23 to be inserted into the other serration 28.2 when available. This means that hinge openings 64 may be distributed as desired on the skirt portion 62 of a pivotal coupling element PIC, in symmetry to the hinge line HL or not. Moreover, hinge openings 64 not in use may remain open.

FIG. 29 further illustrates an exemplary distribution of hinge passages 66 opened in the skirt 62 of the pivotal coupling element PIC. Such hinge passages 62 permit the free flow of the selected substance that solidifies to form the structural material SMT, to be injected in the mold 50, to reach both sides of the skirt portion(s) 62 and to penetrate into the serrations 28. Proper penetration and solidification of the substance that becomes the structural material SMT will form a strong bond between the pivotal coupling element PIC, the belts 20, and a reinforcement structure 30 when available.

With a cover C having a plurality of cover panels CP, care may have to be taken to prevent heat exchange between the liquid L held in the container 10 and the container exterior 10EX, shown in FIG. 1, via a possible interstice opened between two adjacent central belts 20CB which are coupled together by a pivotal coupling element PIC. FIGS. 30 to 34 depict exemplary embodiments of sealing methods capable to ensure good thermal sealing properties between adjacent central belts 20CB to prevent undesired heat exchange. FIGS. 30 to 34 illustrate cross-sections of two adjacent central belts 20CB1 and 20CB2 which are coupled together and covered by the pivotal coupling element PIC.

FIGS. 30 to 34 show exemplary coextruded central belts 20CB made out of one or more types of materials M such as for example two materials of different elasticity, namely material M1 and material M2. Each one of the two abutting central belts 20CB may be made to have one portion that is more elastic, or alternatively more rigid relative to the other portion of the belt. For example, the belt back 22 or a portion thereof may be selected as the one more elastic or the one more rigid portion of the belt. The profile of the cross section of each central belt 20CB may be selected as desired and may have protrusions and/or convolutions forming a sealing element 20SE. The belt back portions 22 of two central belts 20CB may mutually match to provide effective thermal sealing properties. Each one of both central belts 20CB 1 and 20CB2 that are mutually coupled together by the pivotal coupling element PIC may be made out of a different type of material, where each one of the central belts 20CB 1 and 20CB2 may be made out of more than one type of material M.

Figure 30:
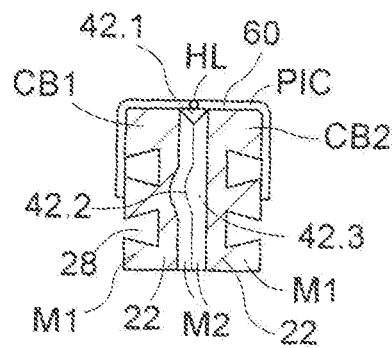
FIGS. 30 to 34 show various sealing methods between central belts.

FIG. 30 depicts an exemplary embodiment of central belts 20CB made out of a first type of material M1, where the abutting belt back portions 22 may be made out of a second type of material M2. A top belt recess 42.1 may be disposed adjacent the pivotal coupling element PIC. An intermediate belt recess 42.2 made out of the second type of material M2 may be formed in the first central belt 20CB 1 and may have a matching protrusion 42.3 which is formed in the second central belt 20CB2. Likewise, the matching protrusion 42.3 may be made out of the second type of material M2 or out of another type of material that may be formed in the second central belt 20CB2.

Figure 31:
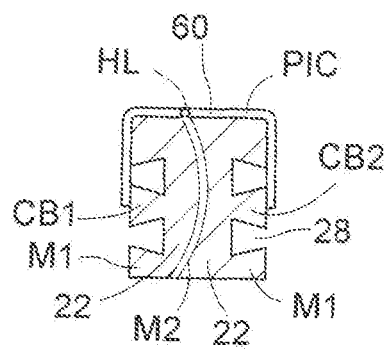

FIG. 31 illustrates another exemplary embodiment of central belts 20CB where the abutting belt back portion 22 of a first central belt 20CB 1 is convex and the back portion 22 of the second central belt 20CB2 is concave and matches the protrusion of the first central belt 20CB1. The first central belt 20CB1 may be made out of a first type of material M1 and the convex portion thereof may be made out of a second type of material M2. The matching second central belt 20CB2 may be made out of one or more different materials M. It is noted that the central belt 20CB1 and the central belt 20CB2 may be mutually asymmetric and that the hinge line HL may be disposed off-center, thus not on the centerline of the connection portion 60 of the pivotal coupling element PIC.

Figure 32:
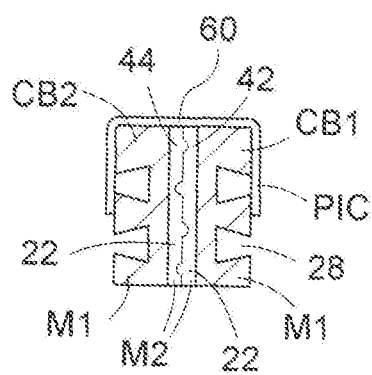

FIG. 32 shows a further exemplary embodiment of central belts 20CB where the abutting back portion 22 of a first central belt 20CB1 has belt protrusions 44 that are matched by belt recesses 42 which are distributed on the belt back portion 22 of the matching central belt 20CB2.

Figure 33:
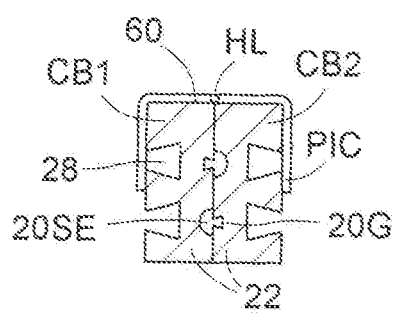

FIG. 33 presents yet a further exemplary embodiment of central belts 20CB where the abutting belt back portions 22 of both central belts 20CB have a belt groove 20G wherein a sealing element 20SE may be coupled by insertion. The belt grooves 20G of both central belts 20CB are offset such that each sealing element 20SE abuts the belt back portion 22 of an opposite belt 20CB. Although not shown in the Figs., more than one belt groove 20G configured for receiving therein a sealing element 20SE may be disposed on one or the other belts 20CB or on both belts.

Figure 34:
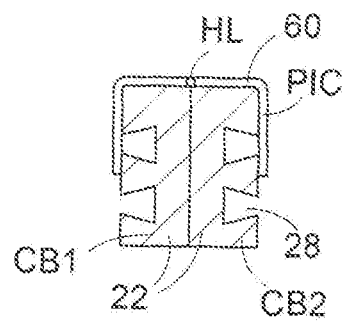

FIG. 34 depicts probably the simplest exemplary embodiment of thermal sealing implementation between the central belts 20CB where the abutting back portions 22 of both central belts 20CB are disposed face to face.

Production of a Cover Having Plural Panels

The production of a typical hinged cover C having a first cover panel CP1 and a second cover panel CP2 is now considered as an example for the production of covers C having a plurality of cover panels CP. In principle, the production process of a cover C having plural panels CP is similar to the production process of a single panel cover C, as described with reference to FIGS. 16 and 17.

Figure 35:
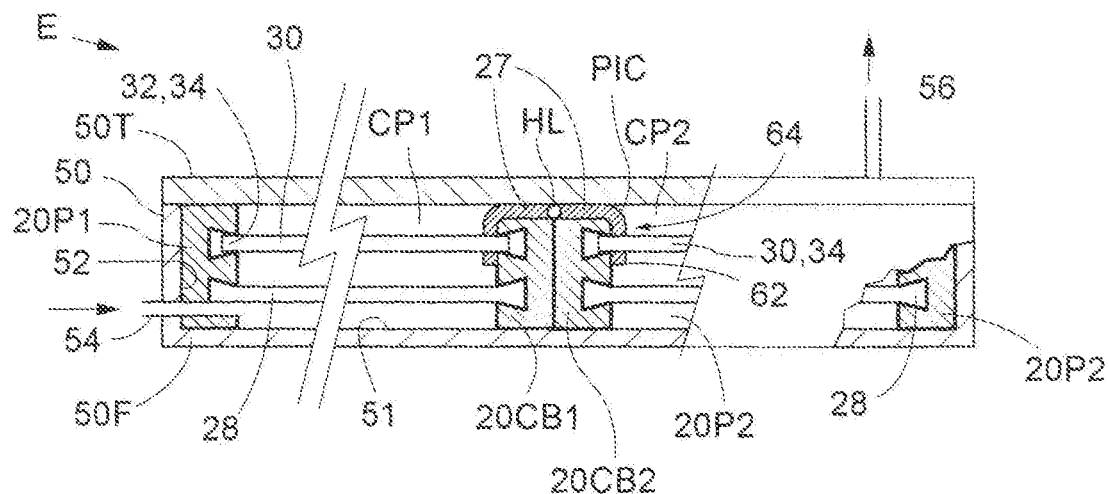
FIG. 35 illustrates a cross-section of a cover having a plurality of panels.

FIG. 35 illustrates a schematic partial cross-section of the mold 50 showing the top portion 50T covering the female portion 50F of the mold 50 before injection therein of the substance that solidifies in the mold 50 into the structural material SMT. FIG. 35 shows cover elements E of the first and the second cover panel, respectively CP1 and CP2, namely the peripheral belts 20P, the central belts 20CB, the reinforcement structure 30 and the pivotal coupling element PIC, but not the substance forming the structural material SMT.

In a first step of production of a cover C having plural panels CP1 and CP2, the belts 20, namely the peripheral belts 20P1 and 20P2 have to be cut to desired length. When there are central belts 20CB, the central belts 20CB1 and CB2 have also to be cut to desired length. Then, the belts 20 have to be introduced in the female mold portion 50F. If desired, steps may be taken prior to introduction of the belts 20 into the female mold portion 50F, to enhance ease of retrieval of the finished cover C out of the opened mold 50, as known to those skilled in the art. For example, by spraying the female mold portion 50F with a mold release substance. The same applies to belts 20 that may be received either as already cut to length, or are cut to desired length in situ, and are inserted in the interior 50IN of the female portion 50F on the bottom wall 51, in snug fit with the mold walls 52. Other embodiments, not shown in the Figs., may include at least two peripheral belts 20P but without, with one, or with more central belt(s). Alternatively, the peripheral belts 20P may include more than one portion which is/are disposed on the bottom wall 51 of the female portion 50F.

Next, the same belt insertion process is repeated with the central belts CB1 and CB2 pertaining to the cover panels CP, respectively CP1 and CP2. If desired, the respective junctions 21 between portions of belts 20, not shown in FIG. 35, may be glued together or coupled together by use of wedges 23, which are not shown in FIG. 35, before or after insertion in the female portion 50F on the bottom wall 51. The mutual back to back abutment of both portions 22 of the central belts 20CB prevents entrance therebetween of the substance forming the structural material SMT.

In a second step of production of the cover C having plural panels CP, the pivotal coupling PIC is stretched and disposed to cover the belt top 27T of the central belts 20CB1 and 20CB2. Depending on their respective length, the skirt portions 62 may cover one or more serrations 28 of the central belts 20CB.

In a third step of production of the cover C with plural panels, the reinforcement structure 30 may be coupled to the belts 20 by insertion of the end extremities 34 of the structural members 32 in one or more serration(s) 28. Coupling of the end extremities 34 to a belt 20 before introduction in the female portion 50F is described hereinabove with reference to FIGS. 18A, 18B, and 18C. For a pivotal coupling PIC with hinge openings 64, the end extremities 34 may be introduced into the one or more hinge openings 64, for example first on the side of the first cover panel CP1, and thereafter on the side of the second cover panel CP2. The flexibility of the belts 20 will allow proper disposition of the end extremities 34 of the structural members 32 into the serration(s) 28, to thereby properly stretch the pivotal coupling PIC over both central belts 20CB. For a skirt portion 62 without hinge openings 64, the end extremities 34 may be pushed together with a portion of the skirt portion 62 into the serration(s) 28 as described hereinabove with reference to FIG. 28, first on the side of the first cover panel cover CP1, and thereafter on the side of the second panel cover CP2. If desired, wedges 23 may be provided or be added to fixedly couple the skirts 62.1 and 62.2 to the central belts 20CB, with or without an adhesive.

For cover panels CP not necessitating a reinforcement structure 30 and if desired, belts 20 may be coupled together by the structural material SMT, and/or by wedges 23 and/or by the use of glue. Likewise, in the absence of the need for a reinforcement structure 30, the pivotal coupling PIC may be fixedly retained to the belts 20 by the structural material SMT, and/or by wedges 23 and/or by an appropriate adhesive substance.

In a fourth and last step for the production of the cover C, as shown schematically in FIG. 35, the selected substance that solidifies to form the structural material SMT is injected into the closed mold 50, via at least one injection nozzle 54, which is/are disposed in the mold 50 in a distribution and in location known to those skilled in the art. Likewise, at least one vacuum port 56 may draw air out of the closed mold 50, which vacuum port(s) 56 is/are disposed in the mold 50 in a distribution and in location well known to those skilled in the art. It is noted that an injection nozzle 54 and a vacuum port 56 may pass through a portion of a belt 20, as depicted in the cross-sections of the belt 20 shown in FIGS. 19 and 20. Once the structural material SMT has solidified, the mold 50 may be opened and, after retrieval of the injection nozzle(s) 54 and the vacuum port(s) 56, the cover C may be retrieved thereout, perpendicular the female mold opening 53, ready for use.

The assembly of the elements E of the cover C into the female mold portion 50F in one direction, and the retrieval of the finished cover C out of the female mold portion 50F are achieved via the female mold opening 53 but in opposite direction. Furthermore, the cover C is provided as a finished product free of mechanical fasteners such as pins, dowels, studs, rivets, bolts, screws, or nuts. Such features, including the lack of mechanical fasteners, are beneficial and enhance automatic and/or robotic assembly and production of the cover C, as well as manual assembly.

Production of a Foil-Covered Cover Having Plural Panels

A further component E, such as a foil F may envelop the cover C as an additional protection against wear and tear. The foil F may be selected as a wear, tear, and abrasion-resistant, thermal insulating, and water-tight material such as a sheet of an appropriately selected material.

Figure 36:
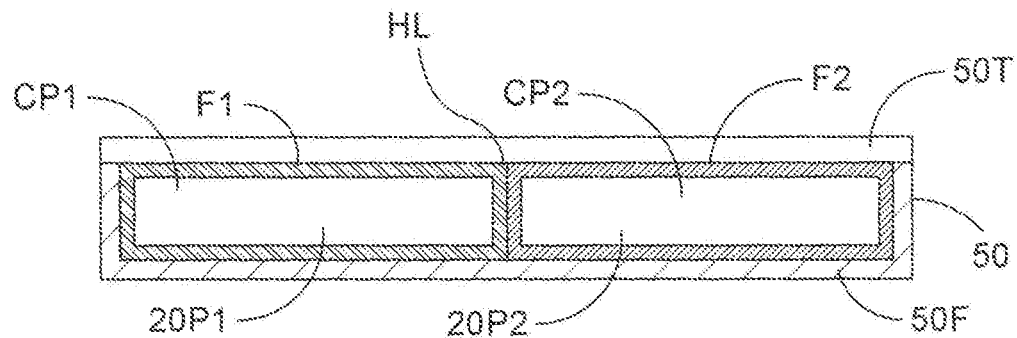
FIG. 36 illustrates cover panels of the cover enveloped by the foils, and FIGS. 37 to 40 refer to production steps.

FIG. 36 illustrates an exemplary schematic embodiment of the cover panels CP1 and CP2 of the cover C enveloped respectively by the foils F1 and F2. FIG. 36 depicts a partial cross-section of a side elevation of the female portion 50F of a closed mold 50 showing the foils F1 and F2, and the peripheral belts 20P1 and 20P2 which cover and hinder view of the solidified structural material SMT wherein reinforcement structures 30 may be embedded. The hinge line HL schematically represents an axis X about which the cover panels CP1 and CP2 will be able to pivot relative to one another. The production of a cover panel CP to be enveloped by a foil F is similar to that of a cover panel CP without a foil F. A film-wrapped cover C having a plurality of cover panels CP1 and CP2 wrapped respectively by the foils F1 and F2 is now considered. For the sake of ease of description, the production steps refer sequentially to the cover panels CP1 and CP2, while in practice some of the production steps could preferably be performed in parallel order for both cover panels CP1 and CP2.

In a production step one, similar to the description relating to FIGS. 21 to 23, a portion of a first foil F1 is disposed on the bottom wall 51 of the open female mold 50F while portions thereof sufficient to later be folded over and envelope the first cover panel CP1 remain temporarily disposed on the exterior 50EX of the open female mold 50F. The first foil F1 may be provided precut to desired dimensions or may be appropriately cut to dimensions in situ, to be then introduced and disposed in and on one side of the open female mold portion 50F.

In a production step two, the first peripheral belt 20P1 is disposed in the open female mold 50F, on top of the first film F1 which is disposed on the bottom wall 51. As described hereinabove, the first peripheral belt 20P1 may be provided precut to desired length or be cut to size in situ.

In a production step three, the first central belt CB1 is disposed in the open female mold 50F, on top of the first film F1, to abut the ends 20E of the first peripheral belt 20P1 so as to form a closed periphery of belts 20. As described hereinabove, the first central belt CB1 may be provided precut to desired length or be cut to appropriate size in situ.

FIG. 37 schematically illustrates the configuration obtained after the production step three, but does not depict the serrations 28 of the belts 20. The open female mold portion 50F is shown to hold the first film F1 in the interior 50IN of a first side in the female mold portion 50F which is dedicated to form the first cover panel CP1. A first large film flap FLP1 is shown to extend out to the exterior 50EX of the female mold 50F. A second film flap FLP2 is shown to be disposed at a level practically flush with the belt top 27T of the first central belt 20CB1 but for the thickness of the pivotal coupling PIC. The remaining two short film flaps FLP3 and FLP4 protrude above the belt top 27T of the first peripheral belt 20P1. The bottom wall 51 is seen in a yet empty second side of the female mold 50F.

In a production step four, the production steps one to three for the first cover panel CP1 are repeated for the second cover panel CP2 in the remaining free second side of the open female mold portion 50F. However, the second film F2 is disposed in the second portion of the female mold portion 50F such that relative to the first large film flap FLP1, the second film flap FLP2 is arranged to close in an opposite direction relative to the first film flap FLP1. This means that if the first film flap FLP1 closes clockwise, then the second film flap FLP2 will close anticlockwise and vice versa. After production step four, the open female mold portion 50F holds two films F1 and F2 configured to cover the first and the second peripheral belts, respectively 20P1 and 20P2, and further contains the first and the second central belts, respectively 20CB1 and 20CB2.

In practice, steps one to three could be performed in parallel for each cover panel CP1 and CP2. Thus, in the female portion 50F, the films F1 and F2 could have been disposed side by side, then the peripheral belts 20P1 and 20P2 could be entered in the mold portion 50F, to be followed by both central belts 20CB1 and 20 CB2.

In a production step five, the pivotal coupling PIC is stretched and disposed over the two central belts 20CB1 and 20CB2, as described hereinabove.

In a production step six, one or more reinforcement structures 30 may be coupled in sequence to the belts 20 of one or both cover panels CP1 and CP2, as described hereinabove. Production step six may be omitted when a reinforcement structure 30 is not necessary for both of the cover panels CP1 and CP2.

In a production step seven, the portions of the first film F1 and of the second film F2 disposed on the exterior 50EX of the open female mold 50F are folded and stretched so as to envelope therein and cover the top portion of the belts 20. The film flaps FLP1 and FLP2 may thus cover the central belts, respectively 20CB1 and 20CB2, and at least a portion of each one of the belt tops 27T of the peripheral belts 20P1 and 20P2. The edges of the films F are configured to be stretched and disposed to meet on and remain attached to the belt tops 27T and if desired, may be adhered thereto. Thereby, the first cover panel CP1 and the second cover panel CP2, and possibly reinforcement structure(s) 30, less the solid foamed structural material SMT, are disposed side by side in the open female mold 50F.

FIGS. 38 and 39 show a partial cross section of the side elevation of the female mold portion 50F that depicts the configuration obtained after the production step seven. FIG. 38 is a partial cross-section of a side elevation taken parallel to a central belt 20CB 1 and perpendicular through the two opposite portions of the first peripheral belt 20P1 in the direction of the arrow LAT shown in FIG. 37. FIG. 38 shows the relative disposition of the large first film flap FLP1 and of the short film flap FLP4 when folded on the belt tops 27T. FIG. 39 depicts the configuration obtained after the production step seven. The partial cross-section of FIG. 39 is taken perpendicular the central belts 20CB and illustrates the relative disposition of the large first film flaps FLP1 and of the short film flaps FLP4 when folded on the belt tops 27T.

In a production step eight, the top portion 50T is closed over the female mold portion 50F. The mold 50 is thus closed, to produce therein a cover C having two cover panels namely CP1 and CP2. The description of the production steps regarding the first cover panel CP1 is in principle the same as that for the second cover panel CP2. As described hereinabove, the at least one substance selected to form the solid foamed structural material SMT is injected into the closed mold 50, via at least one injection nozzle 54. Likewise, at least one vacuum port 56 may draw air out of the closed mold 50. Both the at least one injection nozzle 54 and the at least one vacuum port 56 may be disposed in the mold 50 in a distribution and location known to those skilled in the art. A detail of an example of how an injection nozzle 54 and a vacuum port 56 may pass through a portion of a belt 20 is depicted in the cross-sections of the belt 20 shown in FIGS. 19 and 20. The same is valid for a belt covered by a foil F, even though no foil F is shown in shown in FIGS. 19 and 20. After injection of the at least one selected substance forming the structural material SMT and once this last one has solidified, the injection nozzle(s) 54 and the vacuum port(s) 56 may be retrieved out of the mold 50, the mold 50 is opened and the cover C is retrieved thereout, as a finished product ready for use.

Figure 40:
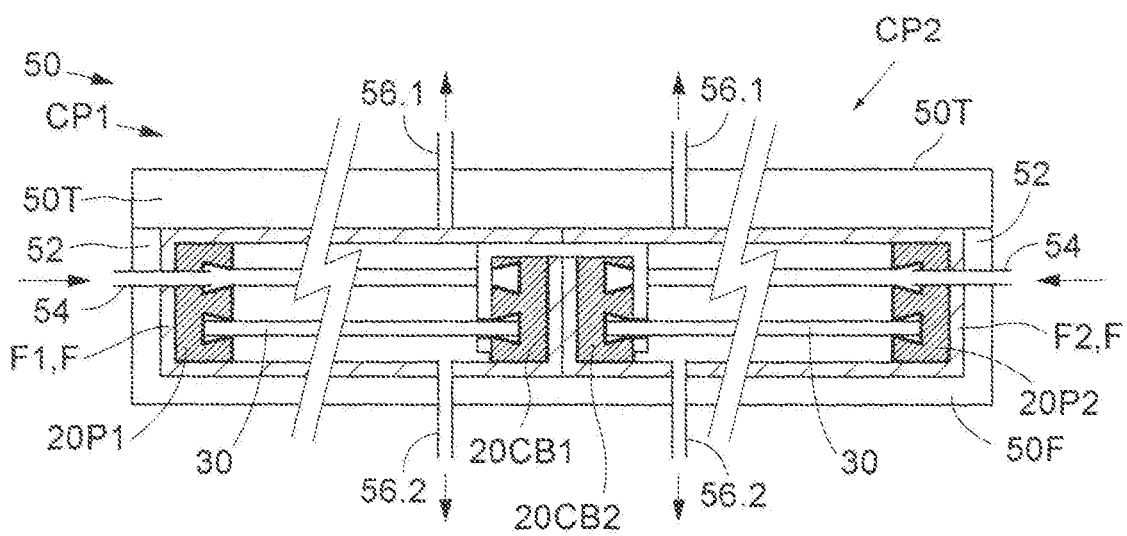

FIG. 40 depicts a partial cross-section of the side elevation of the closed mold 50 ready to produce a film F wrapped cover C having two cover panels namely CP1 and CP2. In FIG. 40, for each one cover panel CP, an exemplary injection nozzle 54 is shown, in schematic form, to pass through a wall 52 of the female mold 50F, through the film F and through the peripheral belt 20P. Two vacuum ports 56, namely a first vacuum port 56.1 and a second vacuum port 56.2, shown in schematic form, may be disposed to draw air out of the closed mold 50. To begin with, the first vacuum port 56.1 may exert a first vacuum pressure to cause the film F disposed in the interior 50IN of the female mold 50F to cling to the top portion 50T of the mold 50. Thereafter, the second vacuum port 56.2 may exert a second vacuum pressure, lower than the first vacuum pressure, to empty air out of the interior 50IN of the female mold 50F while the difference in vacuum pressure causes the film F to cling to the top portion 50T.

Selection of Materials

Since the purpose of the cover C is to provide a lightweight load supporting heat insulating and water impervious barrier for covering a container 10, the materials for the production thereof and of the cover elements E included therein are selected accordingly. This means that mutual compatibility in the range of operating conditions have to be considered. Those skilled in the art will be able to choose the appropriate materials for the implementation of the cover C in view of the present disclosure detailing the operation and mutual interaction of the various cover elements E. The necessary materials may be reinforced, and/or be selected as alloys or combinations of off-the-shelf available products.

The belts 20 and the sealing element 20SE which may be extruded or coextrude are preferably selected as a pliable material of predetermined rigidity and made from at least one type of material. For example, plain or foamed material, such as rubber, say Neoprene foamed or not, or silicone rubber, or synthetic materials such as elastomers or plastic materials such as flexible PVC (polyvinyl chloride) may be considered as one type of material. Other materials may include Neoprene, foamed or not, EPDM rubber, silicone rubber, and RTV. A foamed or other plastic or synthetic material may be selected as second material for co-extrusion.

The solidified structural material SMT may be implemented out of foamed closed-cell material with or without a solid exterior skin, such as an expandable polyurethane based material say in the form of polyurethane foam for example.

The optional reinforcement structure 30 and the wedges 23 may be made of rigid load-supporting materials, such as natural materials, metals, synthetic materials, i.e. plastics, composite materials, carbon fiber materials, or a combination of alloys and of different materials. Some alternatives may include wood, aluminum, engineering plastics, Kevlar, and polyurethane.

The pivotal coupling PIC operating as a hinge is preferably chosen as a flexible and pliable sheet or weaving of appropriately treated material such as carbon fiber, Kevlar cloth, Twaron cloth, or another synthetic textile, appropriately treated if necessary.

The foil F or film F, or membrane F which may operate as a tear, wear, water and climate resistant barrier may be made out of polyethylene or polyurethane based material for example, but various other plastic materials may be considered.

In use, a cover C is disposed to cover a container 10 in the well known manner. The cover C, or a cover portion CP that covers the container opening 16 may be easily handled, say displaced, or removed, or opened, or closed, by simply grabbing the belt peripheral belt 20P. Such handling of the cover C is a straightforward and effortless manual operation.

Custom-Made Modular Cover C

The embodiments described hereinabove refer to a cover C having at least one cover portion CP and to a method for producing such a cover which may be considered as a custom-made cover C implemented out of modular elements E. Different compatible elements E may be selected, possibly out of a stocked supply of such modular elements E, to form diverse cover C combinations in response to various requirements. Such requirements may include not only the size of the desired container opening 16 to be covered, but also for example, ambient conditions, the number of cover portions CP and the range of loads W to be supported by each cover portion CP.

There has thus been described a method for using a mold 50 for producing a cover C for a container 10 and a cover C for covering the container 10, with the cover C being made according to the method as described.

The cover C may be produced by a method using a mold 50, having an open state and a closed state, in at least one molding cycle which may include three phases. The molding cycle may include opening the mold 50 to the open state and assembling therein, free of mechanical fasteners, of at least two functionally different cover elements E. This means that the cover C is void of mechanical fasteners such as for example, bolts and screws and that the at least two functionally different cover element E may include at least a belt 20 and a reinforcement structure 30. Thereafter comes closing the mold 50 to the closed state and injecting therein at least one substance that solidifies into a structural material SMT which forms a third cover element E. Finally arrives opening the mold 50 to the open state and retrieving the cover C thereout ready for use. The mold 50 is designed, configured and controlled to ensure controlled solidification of the at least one substance into a rigid closed-cells foamed structural material SMT.

The cover elements E may be entered into the female mold opening 53 in one direction, and be retrieved thereout in the opposite direction, which in addition to manual manufacture is practical for robotic/automatic assembly in the interior of the female mold portion 50F. It is well known to those skilled in the art that one or more robots may easily carry out such an assembly process. Furthermore, the operation of the mold 50 including opening, closing, as well as the injection, solidification and ejection out of the mold 50 may be fully automatic. The production process for assembly of the cover elements into the female mold portion 50F and the operation of the mold 50 may proceed under the guidance of a controller as well known to those skilled in the art of automatic production equipment and systems, and needs therefore not to be described.

The third solidified structural material SMT may include at least one or more features out of a group including a rigid load-supporting capability, a water impervious closed-cell foamed material which may be lightweight, and a thermally insulating barrier.

The at least one belt 20 may include at least a peripheral belt 20P or at least a peripheral belt 20P and a central belt 20CB.

The at least one peripheral belt 20P provides at least one or more features out of a group including a thermal barrier, a support for the reinforcement structure 30, a support for the structural material SMT, and a protective lateral peripheral boundary 19 which is operable as a handle or a handgrip HG for handling the at least one cover C.

The reinforcement structure 30 provides at least one or more features including a support for the shape of the at least one belt 20, a support for a load W disposed on the cover C, and a support for the structural material SMT.

The at least one belt 20, the reinforcement structure 30, and the solidified structural material SMT are operatively coupled in mutual supportive association.

The cover C may include at least two cover panels CP, wherein each cover panel CP has two or more belts 20. At least a portion of each one of the two or more belts 20 may be disposed adjacent to each other, as adjacent belt portions. A pivotal coupling PIC may be supported by two adjacent belt portions for forming a rotatable hinge accommodating mutual pivotal rotation of each one cover panel CP relative to the other cover panel CP.

Each one of the at least two adjacent cover panels CP may have a central belt 20CB, and the central belt 20CB of one cover panel CP is adjacent the central belt 20CB of the adjacent cover panel CP.

At least one cover panel CP may include a reinforcement structure 30, which provides support for a pivotal coupling PIC. Evidently, when each one of two adjacent cover panels includes a reinforcement structure 30, both reinforcement structures 30 may support the pivotal coupling PIC. The reinforcement structure 30 may provide a fixed attachment of the pivotal coupling PIC to at least one belt 20.

The reinforcement structure 30 may provide support for at least one or more features including the shape of at least one belt 20, support for the structural material SMT, support for the pivotal coupling PIC, and support for a load W disposed on the cover C.

If desired, the at least one cover panel CP may be enveloped by a protective foil or film F.

The structural material SMT is selected to provide support for at least one or more features including the pivotal coupling PIC, the shape of at least one belt 20, the pivotal coupling PIC, and a load W disposed on the cover C.

There is provided a method for producing a cover C for a container 10 by using a mold 50 having an open state and a closed state, wherein the cover C has at least one cover panel CP. The method may comprise automatic control including automatically controlling and operating a robot and the mold 50. Operating the robot may include inserting and assembling at least two functionally different cover elements E in the mold 50 when disposed in the open state, and mutually assembling the cover elements E in fastener-free assembly. Closing the mold 50 may include automatically injecting therein by controlled operation of at least one substance for forming a solidified third cover element E. Opening the mold 50 may include automatically retrieving the cover C out of the mold as a finished product ready for use.

A cover C configured for covering a container opening, wherein the cover C is made according to any one of the method steps described hereinabove.

A cover C having at least one cover panel CP which may be configured to cover a container opening 16, wherein the cover C may be made by use of a mold 50 having an open state and a closed state. The cover may comprise at least two functionally different cover elements E and a structural material SMT. The at least two functionally different cover elements E may be configured to be controllably and automatically assembled in the interior of the mold 50 when in the open state, wherein the assembly may be free of mechanical fasteners. The structural material SMT which is a third cover element E may be formed by solidification of at least a substance that is injected in the mold 50 when in the closed state, whereby opening of the mold 50 to the open state allows to retrieve the cover C thereout ready for use.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

INDUSTRIAL APPLICABILITY

The method and the cover described hereinabove are applicable for production in industry.

LIST OF REFERENCE ITEMS

Item
B belt
C cover
CBS cover bottom side
CP cover panel
CP1 first cover panel
CP2 second cover panel
CP3 third cover panel
CBS cover bottom side
CPR cover periphery
CTS cover top side
E cover element
F film
HG handle or handgrip
H hinge
HL hinge line
H1 first hinge
H2 second hinge
L liquid
PIC pivotal coupling
SMT structural material
W load
10 container
12 container bottom
14 container walls
16 container opening
18 container rim
19 lateral peripheral boundary of the container
20 belt
20P peripheral belt
20.1 first peripheral belt 20P.1
20.2 second peripheral belt 20P.2
20CB central belt
20CB 1 first central belt
20CB2 second central belt
20E belt end
20G belt groove
20H belt head
20SE sealing element
21 belt junction
22 belt back
23 wedge
23A angle wedge
24 belt height
25 belt tooth
26 serrated side
27T belt top
27B belt bottom
28 serrations
28.1 first serration 28.1
28.2 second serration
30 reinforcement structure
32 structural member
33 closure lid
34 end extremity of the structural members 32
35 side walls of the structural members 32
36 beam web
37 beam bottom wall portion
38 flange portion
39 open passage in beam 20
42 belt recess
44 belt protrusion
50 mold
50EX mold exterior 50EX
50F female portion of mold 50
50IN interior of 50F
50T top portion of 50F
51 bottom wall of 50F
52 mold walls
53 female mold opening
54 injection nozzle
56 vacuum port
56.1 first vacuum port
56.2 second vacuum port
58 mold wall of top portion 50T
60 connection portion of PIC
61 hinge back
62 skirt portion of PIC
62.1 first skirt portion
62.2 second skirt portion
64 hinge opening
64C circular hinge opening
64R rectangular hinge opening
66 hinge passage
68 hinge portion
70 abrasive protection pane

The invention claimed is:

1. A cover for covering a container opening, the cover comprising:
at least one cover panel, the at least one cover panel comprising:
at least one belt, the at least one belt being made from a flexible elastomeric material and being configured to insulate and to seal, and the at least one belt comprising a plurality of coupling serrations separated from each other along a thickness direction of the at least one cover panel;
a built reinforcement structure engageably coupled to the coupling serrations of the at least one belt and supporting the at least one belt; and
a structural material configured to support the at least one belt and the reinforcement structure, wherein the at least one belt, the built reinforcement structure, and the structural material are coupled together in mutual self-support, whereby the at least one belt, the built reinforcement structure, and the structural material support each other without requiring an external layer enveloping the at least one belt, the built reinforcement structure, and the structural material.

2. The cover of claim 1, wherein the structural material comprises at least one of a rigid load-supporting material, a lightweight water impervious closed-cell foamed material, and a thermally insulating material.

3. The cover of claim 1, wherein:
the at least one belt is operable as at least two of a thermal barrier, a support for the built reinforcement structure, a support for the structural material, and a protective lateral peripheral boundary operable as a handgrip, and
the at least one belt includes at least one of a peripheral belt and a central belt.

4. The cover of claim 1, wherein the built reinforcement structure is operable as at least two of a support of a shape of the at least one belt, a support for a load disposed on the cover, and a support for the structural material.

5. The cover of claim 1, wherein the cover is produced using an openable and closeable mold which controls forming therein of the structural material, and
the cover is produced in one molding cycle starting with the mold in an open state, passing to the mold in a closed state, and ending in the mold open state.

6. The cover of claim 1, wherein each of the coupling serrations comprises a groove provided on an inner side of the at least one belt so as to be open towards the inner side of the at least one belt, the groove having a dovetail shape and narrowing towards the inner side of the at least one belt.

7. The cover of claim 1, wherein:
the at least one cover panel includes at least a first cover panel and a second cover panel which are disposed in mutually operative coupling, and
the cover further comprises a pivotal coupling operatively coupled between the first cover panel and the second cover panel.

8. The cover of claim 7, wherein the at least one belt of at least one of the first cover panel and the second cover panel includes at least one of a central belt and a peripheral belt.

9. The cover of claim 7, wherein the built reinforcement structure is provided in at least one of the first cover panel and the second cover panel, and at least one of the first cover panel and the second cover panel comprises the pivotal coupling.

10. The cover of claim 7, wherein the pivotal coupling comprises a hinge connecting the first cover panel and the second cover panel such that the first cover panel and the second cover panel are pivotable relative to one another about a hinge line formed therebetween.

11. The cover of claim 10, wherein the hinge comprises a cloth engaged with a coupling serration of each of the first cover panel and the second cover panel.

* * * * *